(12) United States Patent
Hellrung et al.

(10) Patent No.: US 9,022,479 B2
(45) Date of Patent: May 5, 2015

(54) SEAT MECHANISM WITH EASY-ENTRY FEATURE

(75) Inventors: Jacob P. Hellrung, Grosse Pointe Farms, MI (US); John J. Berndtson, Grosse Pointe Woods, MI (US); David W. Milodrowski, Clinton Township, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 206 days.

(21) Appl. No.: 13/511,999

(22) PCT Filed: Dec. 3, 2010

(86) PCT No.: PCT/US2010/058961
§ 371 (c)(1),
(2), (4) Date: Jun. 1, 2012

(87) PCT Pub. No.: WO2011/069107
PCT Pub. Date: Jun. 9, 2011

(65) Prior Publication Data
US 2012/0248841 A1    Oct. 4, 2012

Related U.S. Application Data

(60) Provisional application No. 61/266,725, filed on Dec. 4, 2009.

(51) Int. Cl.
*B60N 2/02* (2006.01)
*B60N 2/20* (2006.01)
*B60N 2/22* (2006.01)

(52) U.S. Cl.
CPC ... *B60N 2/20* (2013.01); *B60N 2/22* (2013.01)

(58) Field of Classification Search
CPC .................................. B60N 2/20; B60N 2/22
USPC ..................... 297/378.1, 378.12, 378.14, 367
See application file for complete search history.

(56) References Cited

U.S. PATENT DOCUMENTS

| | | | |
|---|---|---|---|
| 4,457,557 A * | 7/1984 | Une | 297/362 |
| 5,718,481 A * | 2/1998 | Robinson | 297/367 R |
| 7,775,594 B2 * | 8/2010 | Bruck et al. | 297/362 |
| 2004/0195889 A1 * | 10/2004 | Secord | 297/362 |
| 2006/0012232 A1 | 1/2006 | Coughlin et al. | |
| 2007/0138854 A1 | 6/2007 | Paing et al. | |
| 2009/0001797 A1 * | 1/2009 | Neumann | 297/378.12 |

FOREIGN PATENT DOCUMENTS

| | | |
|---|---|---|
| KR | 10-0601809 B1 | 7/2006 |
| KR | 10-0817000 B1 | 3/2008 |
| KR | 10-2009-0035633 A | 4/2009 |

* cited by examiner

*Primary Examiner* — Sarah B McPartlin
(74) *Attorney, Agent, or Firm* — Harness, Dickey & Pierce, P.L.C.

(57) ABSTRACT

An adjustment mechanism is provided and may include an upper housing plate and a lower housing plate. The adjustment mechanism may also include a recliner mechanism movable between an unlocked state permitting relative rotation between the upper housing plate and the lower housing plate and a locked state preventing relative rotation between the upper housing plate and the lower housing plate. A locking mechanism may selectively permit rotation of one of the upper housing plate and lower housing plate relative to the other of the upper housing plate and the lower housing plate when the recliner mechanism is in the locked state by permitting the recliner mechanism to rotate with the one of the upper housing plate and lower housing plate when in the locked state.

16 Claims, 22 Drawing Sheets

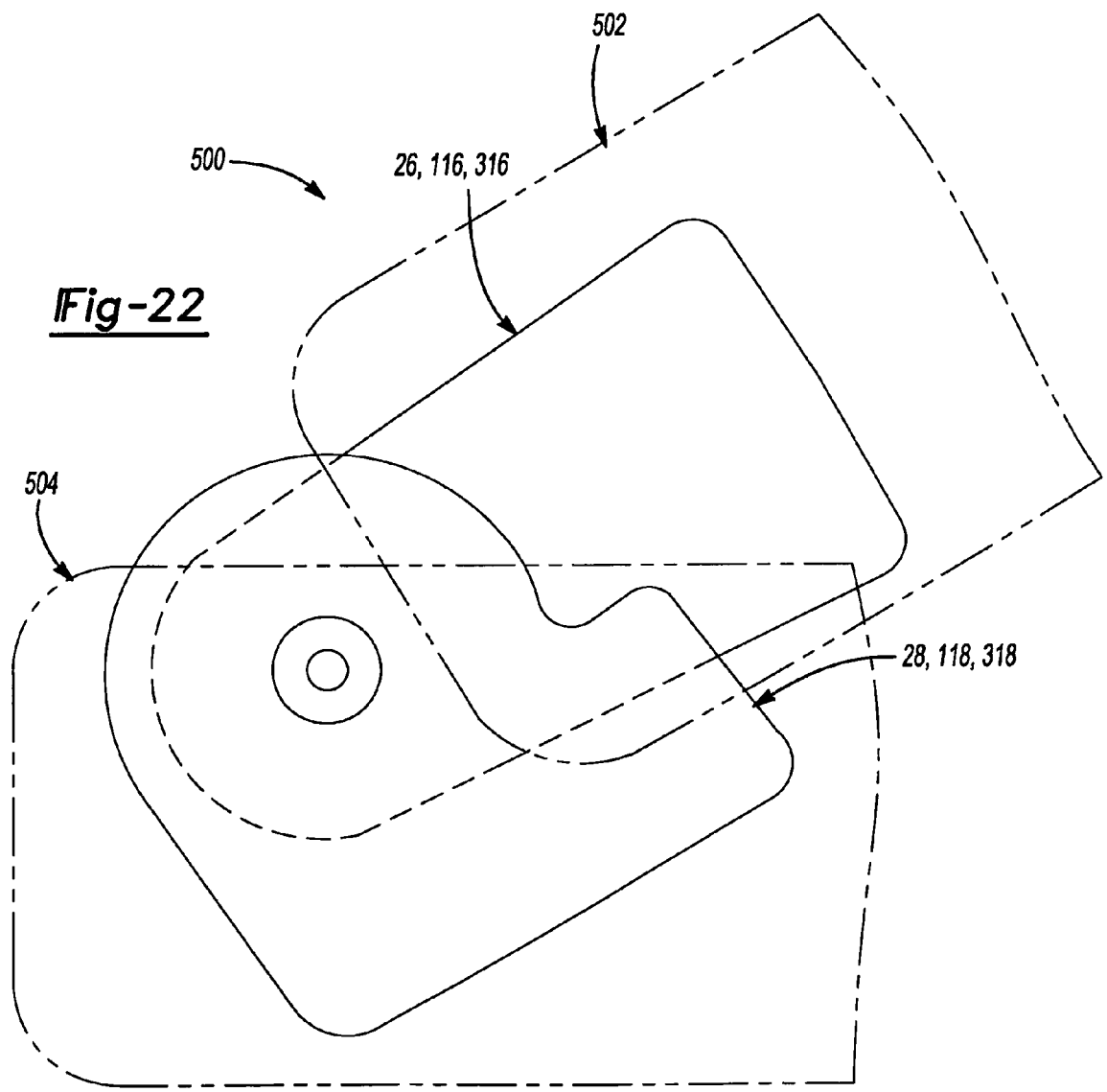

SEAT MECHANISM WITH EASY-ENTRY FEATURE

CROSS-REFERENCE TO RELATED APPLICATIONS

This application claims the benefit of U.S. Provisional Application No. 61/266,725, filed on Dec. 4, 2009. The disclosure of the above application is incorporated herein by reference.

FIELD

The present disclosure relates to recliner mechanisms and more particularly to a recliner mechanism including an easy-entry feature.

BACKGROUND

This section provides background information related to the present disclosure which is not necessarily prior art.

Sport utility and other vehicles accommodating multiple rows of seats are becoming increasingly popular. While providing a vehicle with multiple rows of seating maximizes the number of occupants that can be transported by the vehicle, such additional rows of seating provide challenges to vehicle manufacturers, as access to rear seat assemblies such as second or third-row seat assemblies is often obstructed by front or other intermediate seat assemblies.

Conventional seat assemblies typically include at least one adjustment mechanism that allows a user to pivot, slide, or otherwise move the seat assembly in an effort to permit access to rear seat assemblies and/or to a cargo are of a vehicle. For example, a second-row seat assembly may permit a user to rotate a seatback relative to a seat bottom and into a fold-flat condition. Once in the fold-flat condition, the second-row seat assembly may pivot forward or "dump" along with the seat bottom, thereby providing access to a third-row seat. In another configuration, an easy-entry mechanism may allow a seatback to rotate forward relative to a seat bottom to permit access to a third-row seat without moving the seat bottom.

A seat assembly may additionally include a recliner mechanism that provides for angular adjustment of the seatback relative to the seat bottom. Such recliner mechanisms permit a user to position a seatback relative to a seat bottom when the seat assembly is in an upright and usable position to allow the user to position the seatback in a comfortable position.

While conventional seat assemblies may include an easy-entry mechanism that permits the seat assembly to be moved quickly into a forward or easy-entry position to permit access to a rear seat or cargo area of a vehicle, for example, such easy-entry mechanisms do not restrict or otherwise prevent a user from actuating a recliner mechanism of the seat assembly when the seat assembly is in such a forward or easy-entry position. Permitting a user to actuate a recliner mechanism when the seat assembly is in an easy-entry position may cause damage to the recliner mechanism and/or surrounding components when the seatback is subsequently returned to an upright and useable position if adjustment of the recliner mechanism relative to the seatback was performed when the seatback was in the easy-entry position. Such a condition may be further exacerbated when the recliner mechanism is a powered, constant-engagement recliner mechanism, as a switch that controls such a powered recliner mechanism may be easily and inadvertently depressed when the seatback is in the easy-entry position.

SUMMARY

This section provides a general summary of the disclosure, and is not a comprehensive disclosure of its full scope or all of its features.

An adjustment mechanism is provided and may include an upper housing plate and a lower housing plate. The adjustment mechanism may also include a recliner mechanism movable between an unlocked state permitting relative rotation between the upper housing plate and the lower housing plate and a locked state preventing relative rotation between the upper housing plate and the lower housing plate. A locking mechanism may selectively permit rotation of one of the upper housing plate and lower housing plate relative to the other of the upper housing plate and the lower housing plate when the recliner mechanism is in the locked state by permitting the recliner mechanism to rotate with the one of the upper housing plate and lower housing plate when in the locked state.

In another configuration, an adjustment mechanism is provided and may include an upper housing plate, a lower housing plate, and a recliner mechanism having a first plate, a second plate, and a locking mechanism. The locking mechanism may prevent relative rotation between the first plate and the second plate and between the upper housing plate and the lower housing plate in a locked state and may permit relative rotation between the first plate and the second plate and between the upper housing plate and the lower housing plate in an unlocked state. One of the first plate and the second plate may include an engagement surface that contacts one of the upper housing plate and the lower housing plate when the recliner mechanism is in the locked state to define a first range of motion between the upper housing plate and the lower housing plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 22 is a side view of the seat assembly of FIG. 21 in an easy-entry position.

Corresponding reference numerals indicate corresponding parts throughout the several views of the drawings.

DETAILED DESCRIPTION

Example embodiments will now be described more fully with reference to the accompanying drawings.

Figure 1:
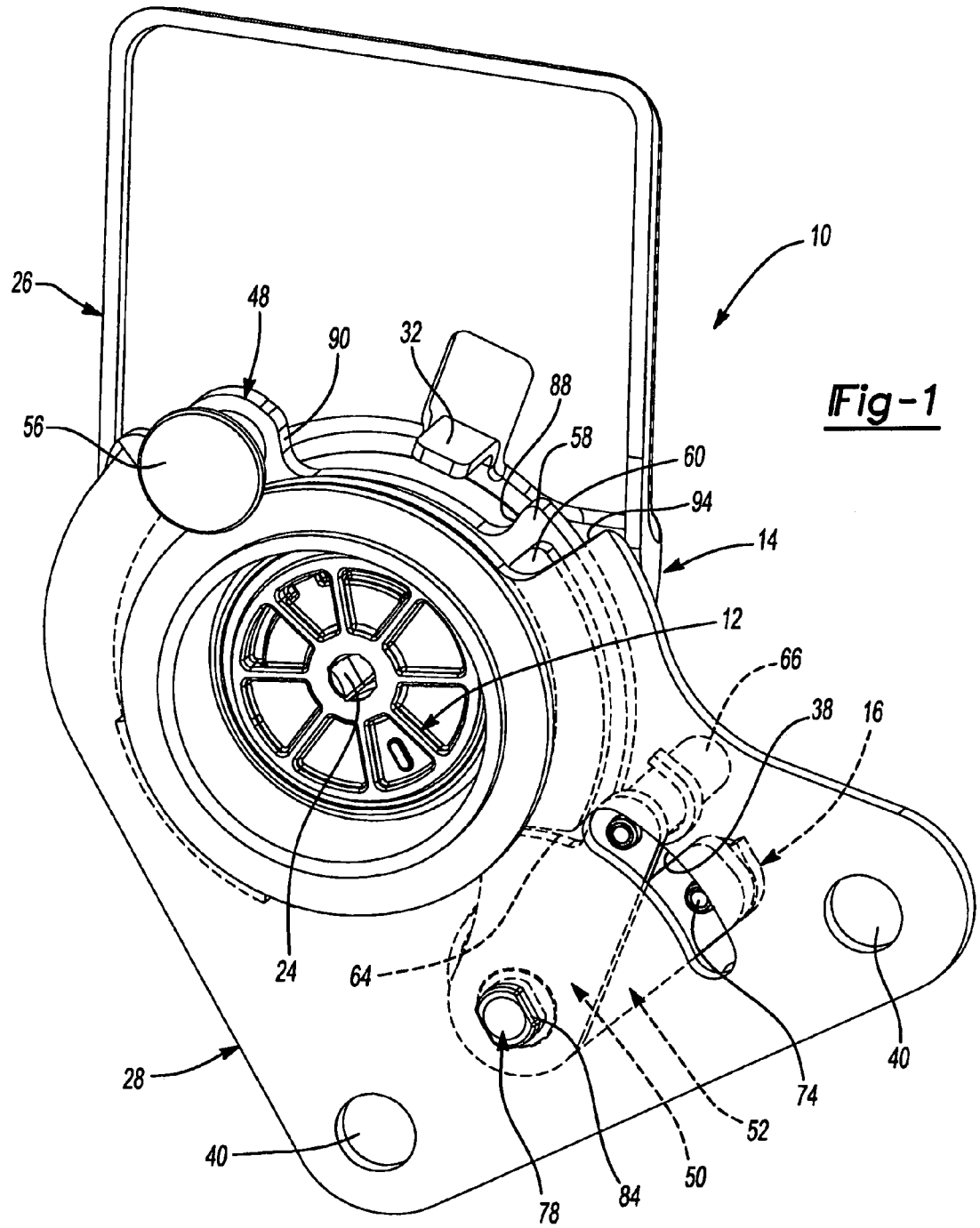
FIG. 1 is a perspective view of an adjustment mechanism in accordance with the principles of the present disclosure for use in conjunction with a seat assembly.
Figure 2:
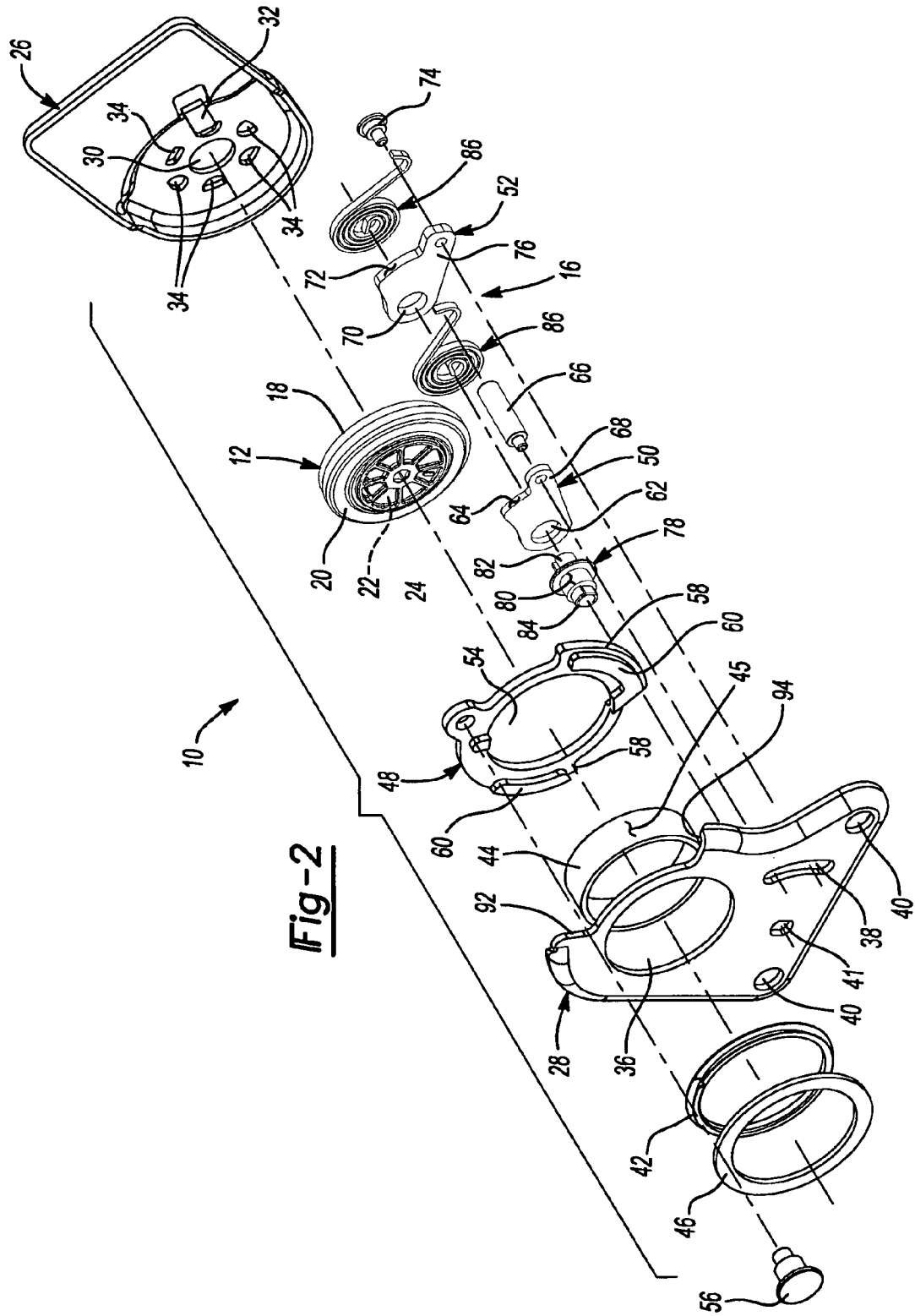
FIG. 2 is an exploded view of the adjustment mechanism of FIG. 1.
Figure 21:
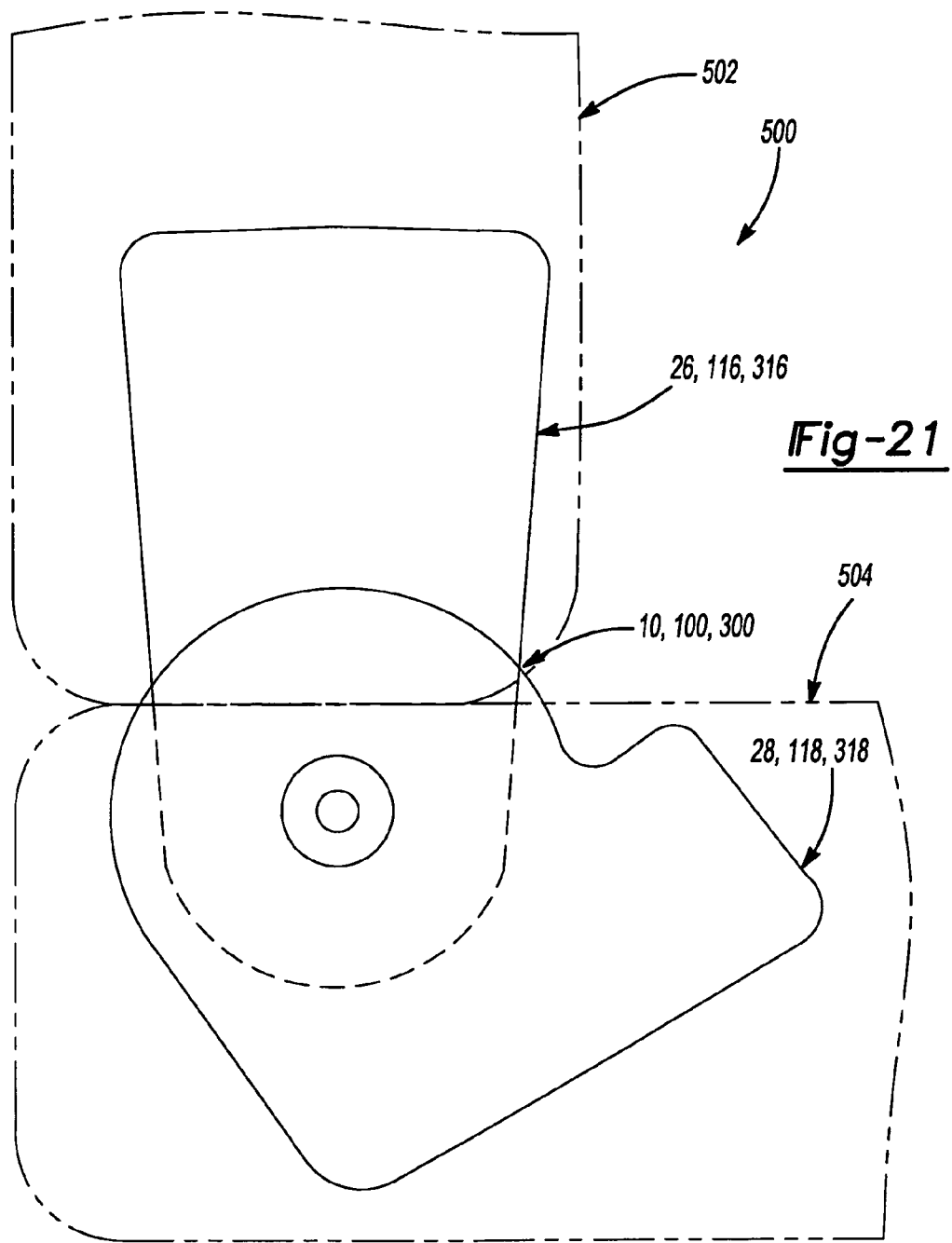
FIG. 21 is a side view of a seat assembly incorporating an adjustment mechanism in accordance with the principles of the present disclosure and in an upright and usable position.

With particular reference to FIGS. 1 and 2, an adjustment mechanism 10 is provided. The adjustment mechanism 10 may include a recliner mechanism 12, a housing 14, and an easy-entry or locking mechanism 16. The adjustment mechanism 10 may be incorporated into a seat assembly 500 including a seatback 502 rotatably supported by a seat bottom 504 (FIGS. 21 and 22). The adjustment mechanism 10 may provide for angular adjustment of the seatback 502 relative to the seat bottom 504 while the easy-entry mechanism 16 may provide for rapid rotation of the seatback 502 relative to the seat bottom 504 to permit and/or facilitate access to rearwardmost seating positions (i.e., a third row of seats) of a vehicle (not shown), for example.

The recliner mechanism 12 may be a round recliner mechanism including a first plate 18, a second plate 20, and a locking mechanism 22. The recliner mechanism 12 may be a continuous or constantly engaged recliner mechanism that is either manually actuated or is actuated via a motor. Conversely, the recliner mechanism 12 may be a discontinuous mechanism movable between a locked state and an unlocked state either manually or via a powered unit (not shown). While the recliner mechanism 12 can be either a continuous recliner mechanism or a discontinuous mechanism, the recliner mechanism 12 will be described and shown as being a continuous recliner mechanism.

The locking mechanism 22 may be disposed generally between the first plate 18 and the second plate 20 and selectively locks the first plate 18 relative to the second plate 20 to prevent relative rotation therebetween. As described, the recliner mechanism 12 may be a continuously engaged recliner mechanism and may be driven by a crossrod (not shown) received within a keyed aperture 24 of the recliner mechanism 12. When the crossrod is not driven, the locking mechanism 22 fixes a position of the first plate 18 relative to the second plate 20.

A motor (not shown) may selectively supply a rotational force to the recliner mechanism 12 to rotate one of the first plate 18 and second plate 20 relative to the other of the first plate 18 and second plate 20. In one configuration, the crossrod is in communication with the locking mechanism 22 of the recliner mechanism 12 via the aperture 24 to achieve relative rotation between the first plate 18 and the second plate 20 when the motor applies a rotational force to the crossrod to permit adjustment of the first plate 18 relative to the second plate 20.

The housing 14 may include an upper housing plate 26 and a lower housing plate 28. When the housing 14 is installed in the seat assembly 500, the upper housing plate 26 may be fixedly attached to a structure of a seatback 502 and, therefore, may be fixed for rotation with the seatback 502. In such a configuration, the lower housing plate 28 may be fixedly attached to a structure of the seat bottom 504 such that the lower housing plate 28 is fixed for movement with the seat bottom 504. As described, when the locking mechanism 22 permits relative rotation between the first plate 18 and the second plate 20 of the recliner mechanism 12, an angular position of the upper housing plate 26 relative to the lower housing plate 28 is adjusted. Because the upper housing plate 26 is fixed for rotation with the seatback 502, an angular position of the seatback 502 relative to the seat bottom 504 is similarly adjusted when an angular position of the upper housing plate 26 is adjusted relative to the lower housing plate 28.

The upper housing plate 26 may include a central aperture 30, a tab 32, and a series of apertures 34 that matingly receive a series of projections 35 (FIG. 3) extending from an outer surface of the first plate 18. The projections 35 may be matingly received within the apertures 34 to fix the first plate 18 for rotation with the upper housing plate 26. The projections 35 may be welded to the upper housing plate 26 at a point between the projections 35 and apertures 34 or may otherwise be fixedly attached to the upper housing plate 26 to fix the first plate 18 to the upper housing plate 26 for rotation therewith.

The lower housing plate 28 may include a main aperture 36, a slot 38, and a series of attachment apertures 40. The main aperture 36 may receive a bushing 42 and a pivot tube 44. The pivot tube 44 may extend at least partially into the main aperture 36 and may ride on a surface of the bushing 42. A position of the pivot tube 44 relative to the lower housing plate 28 may be maintained by attaching a washer 46 to the pivot tube 44 to prevent the pivot tube 44 from moving or disengaging the main aperture 36. In one configuration, the washer 46 may be welded to the pivot tube 44 once the pivot tube 44 is inserted into the main aperture 36. In another configuration, the washer 46 may be integrally formed with the pivot tube 44 prior to insertion of the pivot tube 44 into the main aperture 36 and may contact an outer surface of the lower housing plate 28 to locate the pivot tube 44 relative to the lower housing plate 28.

The easy-entry mechanism 16 may be rotatably supported by at least one of the slot 38 and the attachment apertures 40 of the lower housing plate 28 and may include a quadrant 48, a load cam 50, and a tolerance-absorbing cam 52. The quadrant 48 may include a center aperture 54 received around an outer perimeter of the pivot tube 44 such that the quadrant 48 is rotatable about an outer surface 45 of the pivot tube 44 relative to the lower housing plate 28. The quadrant 48 may also include a post 56, a pair of arms 58, and a pair of projections 60 respectively associated with and extending from the pair of arms 58.

The load cam 50 may include a pivot aperture 62, a cam surface 64, and a pin 66 extending from an extension 68. The tolerance-absorbing cam 52 may likewise include a pivot aperture 70, a cam surface 72, and a pin 74 extending from an extension 76.

A pivot pin 78 may rotatably receive the pivot aperture 62 of the load cam 50 and the pivot aperture 70 of the tolerance-absorbing cam 52 about a cylindrical section 80 thereof to rotatably support the load cam 50 and tolerance-absorbing cam 52 relative to the lower housing plate 28. The pivot pin 78 may further include a spring post 82 and a keyed extension 84, whereby the keyed extension 84 is matingly received within a keyed attachment aperture 41 of the lower housing plate 28 to prevent rotation of the pivot pin 78 relative to the lower housing plate 28.

A pair of biasing members 86 may engage the spring post 82 of the pivot pin 78 to respectively rotationally bias the load cam 50 and the tolerance-absorbing cam 52 relative to the lower housing plate 26. In one configuration, the biasing members 86 are coil springs and respectively apply a rotational force on the load cam 50 and tolerance-absorbing cam 52 to bias the cam surface 64 of the load cam 50 and the cam surface 72 of the tolerance-absorbing cam 52 into engagement with the quadrant 48.

With continued reference to FIGS. 3-6, operation of the adjustment mechanism 10 will be described in detail in conjunction with the seat assembly 500 (FIGS. 21 and 22). When the seatback 502 is in an upright and useable position relative to the seat bottom 504 (FIG. 21), the locking mechanism 22 of the recliner mechanism 12 prevents relative rotation between the first plate 18 and the second plate 20. Because the first plate 18 is fixedly attached to the upper housing plate 26, which is fixedly attached to the seatback 502, and the second plate 20 of the recliner mechanism 12 is fixedly attached to the quadrant 48, which is prevented from rotating relative to the lower housing plate 28 and, thus, the seat bottom 504 due to engagement of the load cam 50 and tolerance-absorbing cam 52 with the quadrant 48, rotation of the seatback 502 relative to the seat bottom 504 is prevented.

When a force is applied to the locking mechanism 22 of the recliner mechanism 12 (i.e., a rotational force provided by a motor to the crossrod at aperture 24), the locking mechanism 22 permits relative rotation between the first plate 18 and the second plate 20 of the recliner mechanism 12. Permitting relative rotation between the first plate 18 and the second plate 20 likewise permits rotation of the upper housing plate 26 and seatback 502 relative to the lower housing plate 28 and seat bottom 504. Specifically, when the locking mechanism 22 permits the first plate 18, upper housing plate 26, and seatback 502 to rotate relative to the second plate 20, lower housing plate 28, and seat bottom 504, the first plate 18 and upper housing plate 26 are permitted to rotate relative to the lower housing plate 28 and seat bottom 504 until either the force applied to the locking mechanism 22 is terminated or the tab 32 of the upper housing plate 26 contacts a first shoulder 88 of the quadrant 48 or a second shoulder 90 of the quadrant 48.

In one configuration, the first shoulder 88 defines a forward-most adjusted position of the upper housing plate 26 relative to the lower housing plate 28 and may be formed by one of the arms 58 of the quadrant 48. The second shoulder 90 may define a rearward-most adjusted position of the upper housing plate 26 relative to the lower housing plate 28 and may be formed by a portion of the quadrant 48 supporting the post 56.

As described above, the upper housing plate 26 is fixed for rotation with the seatback 502 relative to the seat bottom 504 and lower housing plate 28. As such, a distance between the first shoulder 88 of the quadrant 48 and the second shoulder 90 of the quadrant 48 generally defines a range of angular adjustment of the seatback 502 relative to the seat bottom 504 when the seat assembly 500 is in an upright and useable position. As such, the distance between the first shoulder 88 of the quadrant 48 and the second shoulder 90 of the quadrant 48 generally defines a range of motion of the upper housing plate 26 relative to the lower housing plate 28 when the seat assembly 500 is in the upright and useable position (FIG. 21).

When the force applied to the locking mechanism 22 via the crossrod or otherwise is terminated, relative rotation between the first plate 18 and the second plate 20 is prevented due to the locking mechanism 22 of the recliner mechanism 12. Rotation of the upper housing plate 26 relative to the lower housing plate 28 is likewise prevented by the locking mechanism 22 in conjunction with engagement between the quadrant 48, the load cam 50, and the tolerance-absorbing cam 52, as the quadrant 48 is fixed for movement with the second plate 20 of the recliner mechanism 12.

Figure 3:
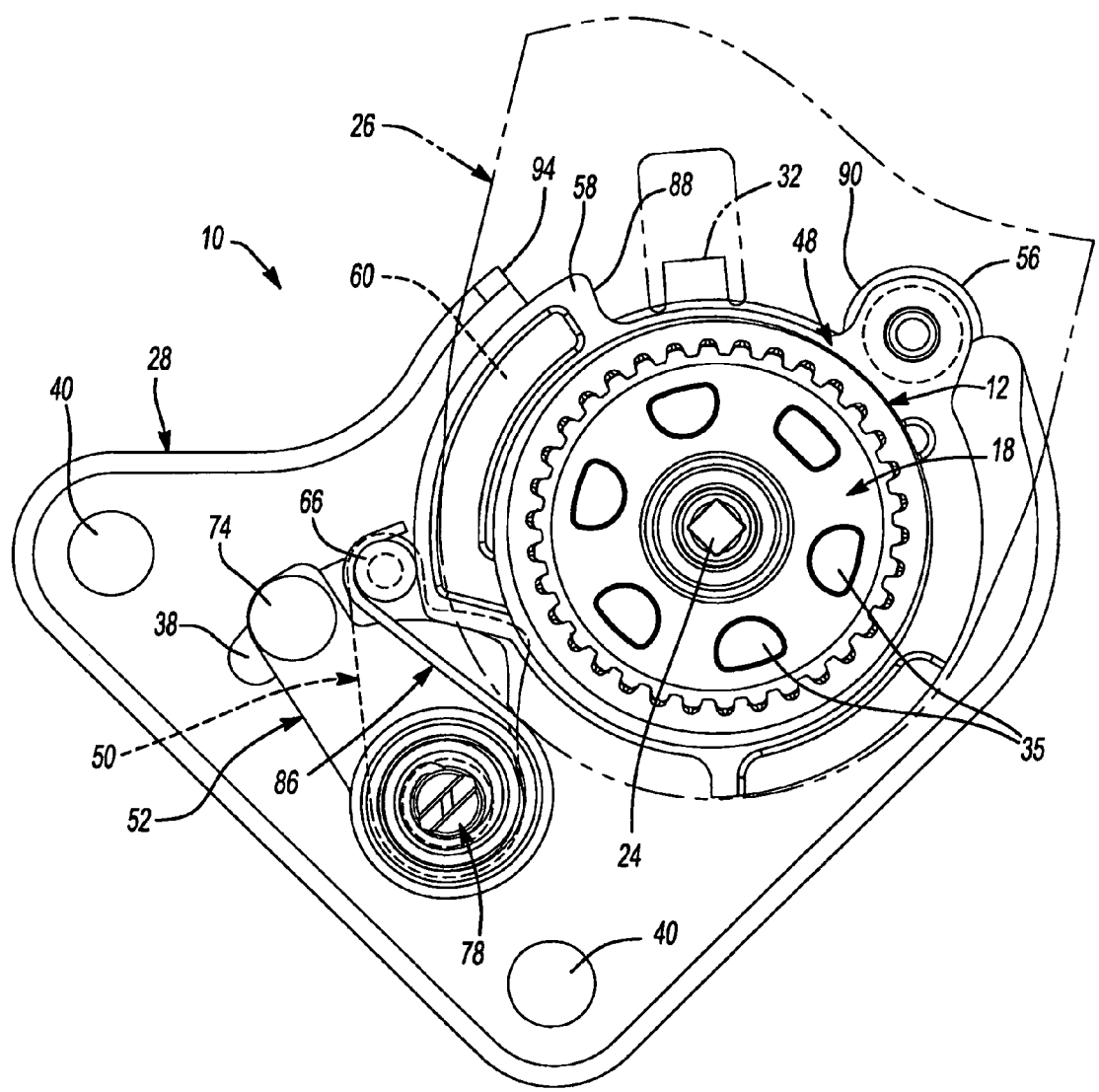
FIG. 3 is a side view of the adjustment mechanism of FIG. 1 with part of a housing removed to show internal components of the adjustment mechanism in a locked state.

The biasing members 86 rotationally bias each of the load cam 50 and tolerance-absorbing cam 52 in a clockwise direction relative to the view shown in FIG. 3. Biasing the load cam 50 in the clockwise direction relative to the view shown in FIG. 3 causes the cam surface 64 of the load cam 50 to engage one of the projections 60 of the quadrant 48. Likewise, rotationally biasing the tolerance-absorbing cam 52 in the clockwise direction relative to the view shown in FIG. 3 causes the cam surface 72 of the tolerance-absorbing cam 52 to contact one of the projections 60 of the quadrant 48.

When the load cam 50 and tolerance-absorbing cam 52 engage the quadrant 48, as described above, rotation of the quadrant 48 relative to the lower housing plate 28 is prevented. Because the quadrant 48 is fixed for rotation with the second plate 20 of the receiver mechanism 12, when the cams 50, 52 engage the quadrant 48, rotation of the second plate 20 relative to the lower housing plate 28 is likewise prevented.

As shown in FIGS. 1 and 3, the pin 74 of the tolerance-absorbing cam 52 is slidably received within the slot 38 of the lower housing plate 28. Interaction between the pin 74 and the slot 38 of the lower housing plate 28 permits the tolerance-absorbing cam 52 to rotate relative to the lower housing plate 28 and the quadrant 48 until the cam surface 72 of the tolerance-absorbing cam 52 contacts a surface of one of the projections 60. Permitting the pin 74 to move within the slot 38 until the cam surface 72 contacts the quadrant 48 accounts for any tolerance between any of the lower housing plate 28, quadrant 48, and tolerance-absorbing cam 52. Accounting for any tolerance between any of the lower housing plate 28, quadrant 48, and tolerance-absorbing cam 52 allows the tolerance-absorbing cam 52 to prevent noise associated with chucking or rattling of components when the upper housing plate 26 and seatback 502 are in a use position relative to the lower housing plate 28 and seat bottom 504. Therefore, under normal use conditions, the tolerance-absorbing cam 52 engages one of the projections 60 of the quadrant 48 to prevent rotation of the quadrant 48 relative to the lower housing plate 28.

When a force is applied to the upper housing plate 26 via the seatback 502 in a load condition, the initial load is transmitted to the lower housing plate 28 via the recliner mechanism 12, quadrant 48, and tolerance-absorbing cam 52. If the load is increased and continually applied to the upper housing plate 26 via the seatback 502, most of the load will be transmitted to the lower housing plate 28 and seat bottom 504 via the recliner mechanism 12, quadrant 48, and load cam 50 due to a lock angle of the load cam 50.

Figure 4:
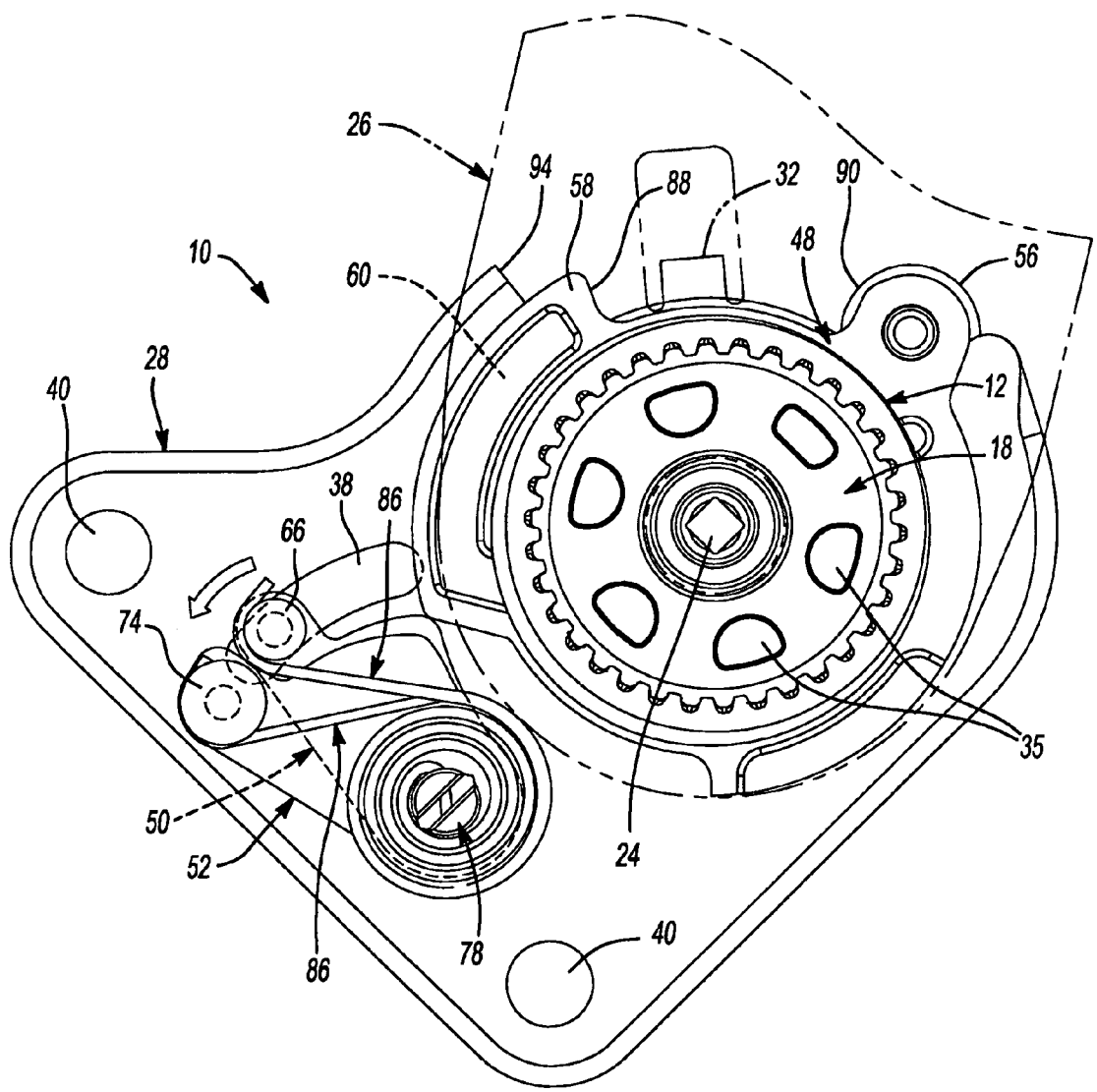
FIG. 4 is a side view of the adjustment mechanism of FIG. 1 with part of a housing removed to show internal components of the adjustment mechanism in an unlocked state.
Figure 5:
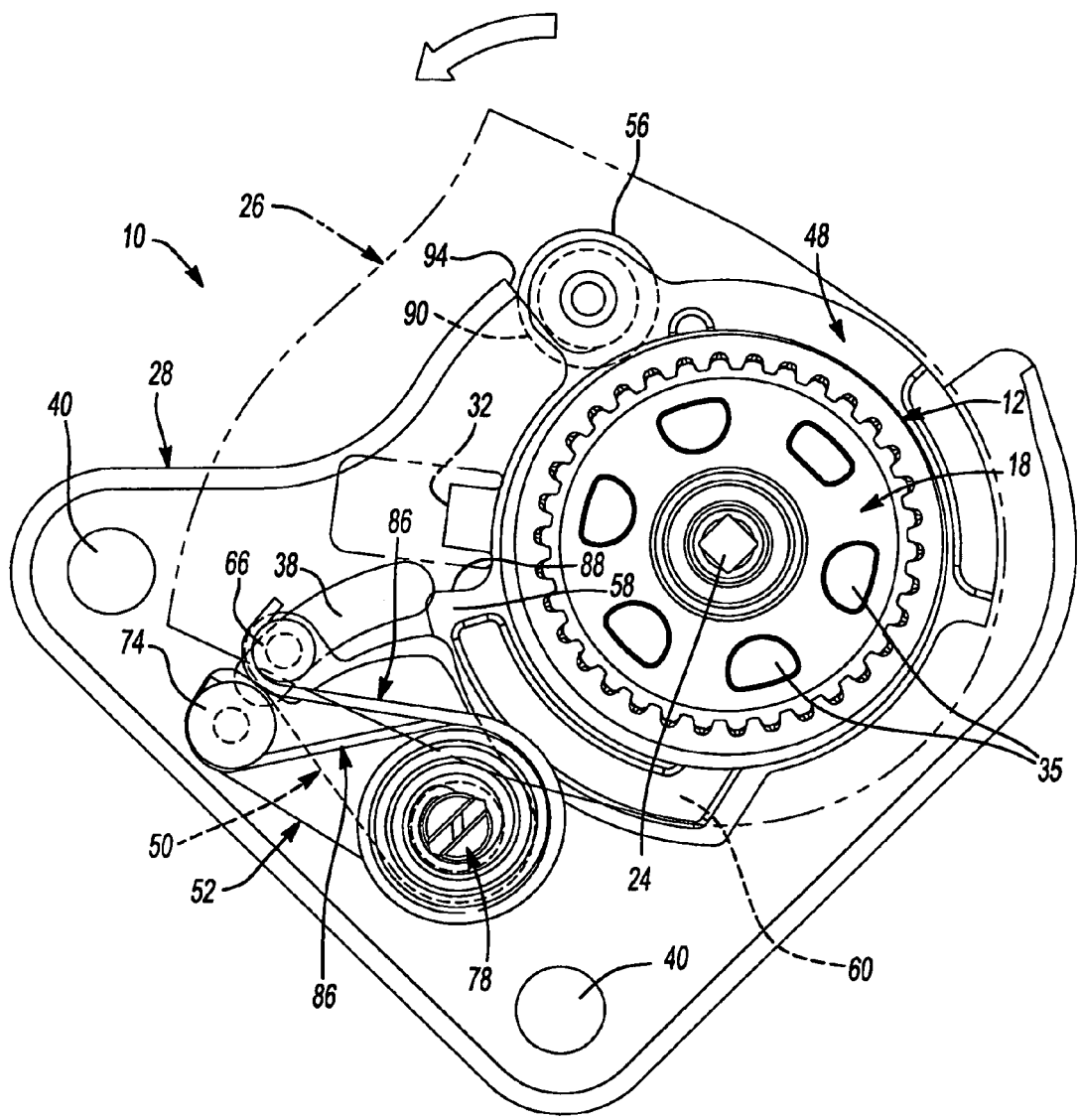
FIG. 5 is a side view of the adjustment mechanism of FIG. 1 with part of a housing removed to show internal components of the adjustment mechanism in an unlocked state and in an easy-entry position.
Figure 6:
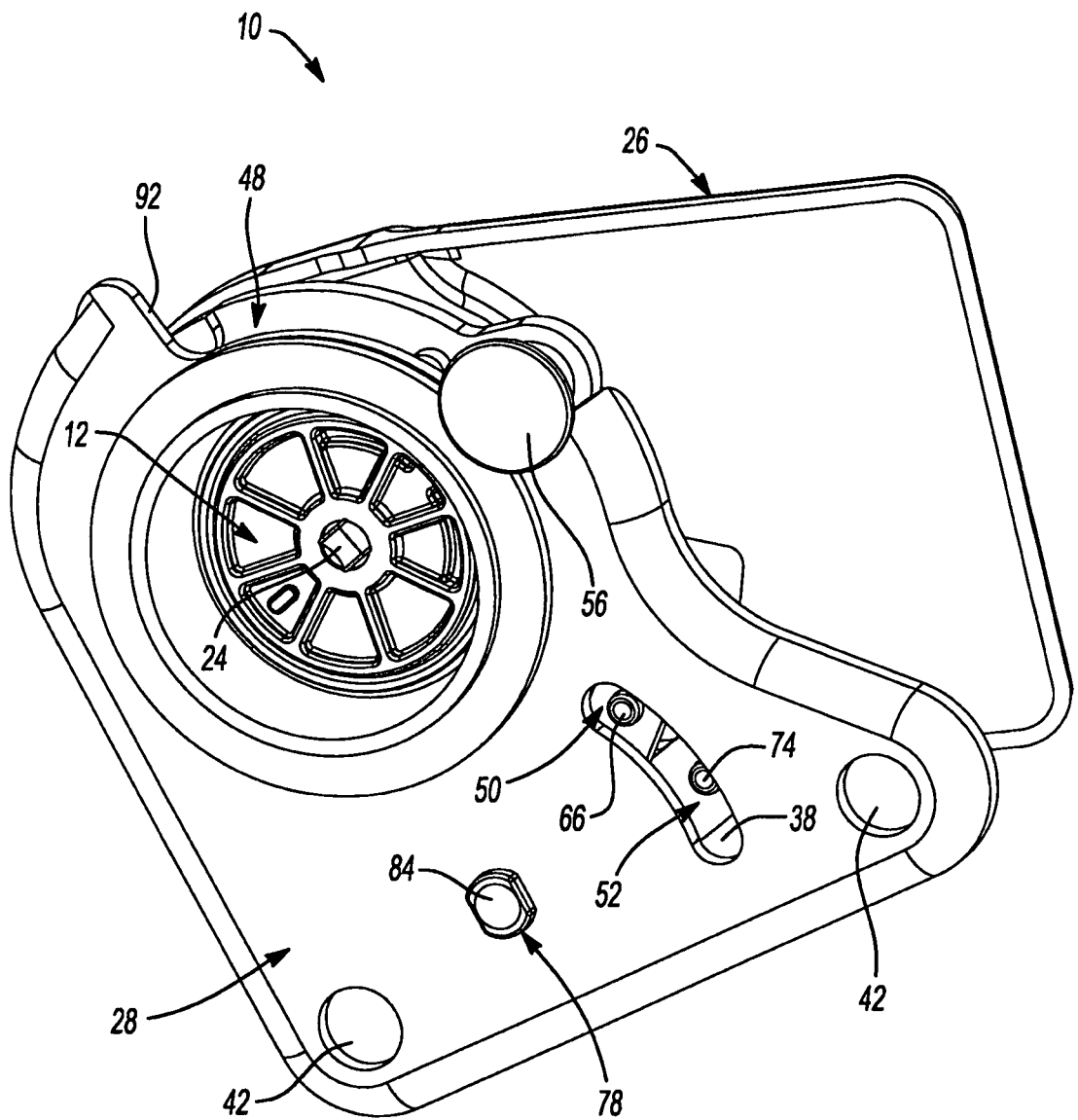
FIG. 6 is a perspective view of the adjustment mechanism of FIG. 1 in an easy-entry position.

When a user actuates the adjustment mechanism 10 to position the seatback 502 in an easy-entry position, whereby the seatback 502 and upper housing plate 26 are quickly rotated forward relative to the lower housing plate 28 and seat bottom 504 (FIGS. 5, 6, and 22), a force is first applied to the easy-entry mechanism 16 to rotate the load cam 50 and tolerance-absorbing cam 52 out of engagement with the quadrant 48 (FIG. 4). A cable (not shown) may be attached to the pin 66 of the load cam 50 such that when a tensile force is applied to the cable, the force is likewise transmitted to the pin 66, thereby causing the load cam 50 to rotate in a counterclockwise direction relative to the view shown in FIG. 4 and against the force applied to the load cam 50 by the biasing members 86. The pin 66 is positioned relative to the extension 76 of the tolerance-absorbing cam 52 such that when the pin 66 is moved in the counterclockwise direction relative to the view shown in FIG. 4, the pin 66 contacts the extension 76 of the tolerance-absorbing cam 52, thereby causing the tolerance-absorbing cam 52 to rotate in a counterclockwise direction relative to the view shown in FIG. 4 and against the force exerted thereon by the biasing members 86.

Once the load cam 50 and tolerance-absorbing cam 52 are sufficiently rotated in the counterclockwise direction relative to the view shown in FIG. 4, the cam surface 64 of the load cam 50 and the cam surface 72 of the tolerance-absorbing cam 52 disengage the quadrant 48, thereby allowing the quadrant 48 to rotate relative to the lower housing plate 28. When the quadrant 48 is permitted to rotate relative to the lower housing plate 28, the quadrant 48 rotates about the outer surface 45 of the pivot tube 44 relative to the lower housing plate 28.

Because the quadrant 48 is fixedly attached to the second plate 20 of the recliner mechanism 12, causing the quadrant 48 to rotate relative to the lower housing plate 28 and pivot tube 44 likewise causes rotation of the second plate 20 of the recliner mechanism 12 relative to the lower housing plate 28 and pivot tube 44. Because the recliner mechanism 12 is in a locked state, whereby the locking mechanism 22 prevents relative rotation between the first plate 18 and the second plate 20, causing rotation of the second plate 20 relative to the lower housing plate 28 likewise causes rotation of the first plate 18 and upper housing plate 26 relative to the lower housing plate 28.

When the easy-entry mechanism 16 permits rotation of the upper housing plate 26 and, thus, the seatback 502 relative to the lower housing plate 28 and seat bottom 504, the upper housing plate 26, recliner mechanism 12, and quadrant 48 all rotate together relative to the lower housing plate 28 and pivot tube 44. Because the load cam 50 and tolerance-absorbing cam 52 are rotatably supported by the lower housing plate 28, the upper housing plate 26, recliner mechanism 12, and quadrant 48 likewise rotate into an easy-entry position relative to the load cam 50 and tolerance-absorbing cam 52.

A force may be applied to the upper housing plate 26 via the seatback 502 to return the upper housing plate 26 to a useable position relative to the lower housing plate 28, thereby returning the seatback 502 to a useable position relative to the seat bottom 504. When the seatback 502 is returned to an upright and usable position, the seatback 502 is positioned relative to the seat bottom 504 at the same angle that the seatback 502 was positioned prior to the seatback 502 being moved into the easy-entry position (FIGS. 5 and 6), as the locking mechanism 22 is in the locked state as the recliner mechanism 12 rotates with the upper housing plate 26 relative to the lower housing plate 28 and into the easy-entry position. Specifically, because the locking mechanism 22 prevents relative rotation between the first plate 18 and the second plate 20 when in the locked state and therefore fixes a position of each plate 18, 20 relative to one another and to the upper housing plate 26, when the recliner mechanism 12 and upper housing plate 26 are rotated about the tube 44 and into the easy-entry position, the relative position of the upper housing plate 26, first plate 18, and second plate 20 is fixed. Therefore, the position of the upper housing plate 26, first plate 18, and second plate 20 is the same prior to, during, and after movement of the seatback 502 into the easy-entry position.

Applying a force to the upper housing plate 26 allows the quadrant 48 to rotate about the outer surface 45 of the pivot tube 44 relative to the lower housing plate 28 until the post 56 of the quadrant 48 contacts a first stop 92 of the lower housing plate 28. Once the post 56 of the quadrant 48 contacts the first stop 92 of the lower housing plate 28, the upper housing plate 26 and seatback 502 are returned to an upright and useable position relative to the lower housing plate 28 and seat bottom 504.

The upper housing plate 26 and seatback 502 are maintained in the upright position due to engagement of the load cam 50 and tolerance-absorbing cam 52 with the quadrant 48, whereby the load cam 50 and tolerance-absorbing cam 52 are rotationally biased into engagement with the quadrant 48 by the biasing members 86. As such, when the post 56 contacts the first stop 92 of the lower housing plate 28, the upper housing plate 26 is automatically returned to a locked state, as the load cam 50 and tolerance-absorbing cam 52 are biased into engagement with the quadrant 48 by the biasing members 86.

While the lower housing plate 28 is described as including a first stop 92 in selective engagement with the post 56, the lower housing plate 28 may also include a second stop 94 spaced apart and separated from the first stop 92. The second stop 94 may likewise engage the post 56 of the quadrant 48 to define a maximum angular position of the upper housing plate 26 relative to the lower housing plate 28 when the upper housing plate 26 and seatback 502 are positioned in an easy-entry position (i.e., a forward articulated position) relative to the lower housing plate 28 and seat bottom 504.

With particular reference to FIGS. 7-13, another adjustment mechanism 100 in accordance with the principles of the present disclosure is provided. The adjustment mechanism 100 may include a recliner mechanism 102, a housing 104, and an easy-entry or locking mechanism 106. The adjustment mechanism 100 may be associated with a seat assembly 500 such as the seat assembly shown in FIGS. 21 and 22. The recliner mechanism 102 may provide for selective angular adjustment of the seatback 502 relative to the seat bottom 504, while the locking mechanism 106 may provide an easy-entry feature to the seatback 50 to allow the seatback 502 to rotate quickly relative to the seat bottom 504 to permit access to an area generally behind the seat assembly 500 in a similar manner, as described above with respect to the adjustment mechanism 10.

The recliner mechanism 102 may be a continuous recliner mechanism and may include a first plate 108, a second plate 110, and a locking mechanism 112. The recliner mechanism 102 may be a continuous or constantly engaged recliner mechanism that is either manually actuated or is actuated via a motor. Conversely, the recliner mechanism 102 may be a discontinuous mechanism movable between a locked state and an unlocked state either manually or via a powered unit (not shown). While the recliner mechanism 102 can be either a continuous recliner mechanism or a discontinuous mechanism, the recliner mechanism 102 will be described and shown as being a continuous recliner mechanism.

The locking mechanism 112 may be disposed generally between the first plate 108 and the second plate 110 and may selectively prevent relative rotation between the first plate 108 and the second plate 110. The recliner mechanism 102 may further include a keyed aperture 114 extending therethrough that matingly receives a crossrod (not shown). The crossrod may apply a rotational force to the recliner mechanism 102 to move the first plate 108 relative to the second plate 110. Rotation of the crossrod may be accomplished manually or, alternatively, may be accomplished via a motor to move the first plate 108 relative to the second plate 110. When the rotational force imparted by the crossrod is stopped, the locking mechanism 112 prevents relative rotation between the first plate 108 and the second plate 110.

Figure 7:
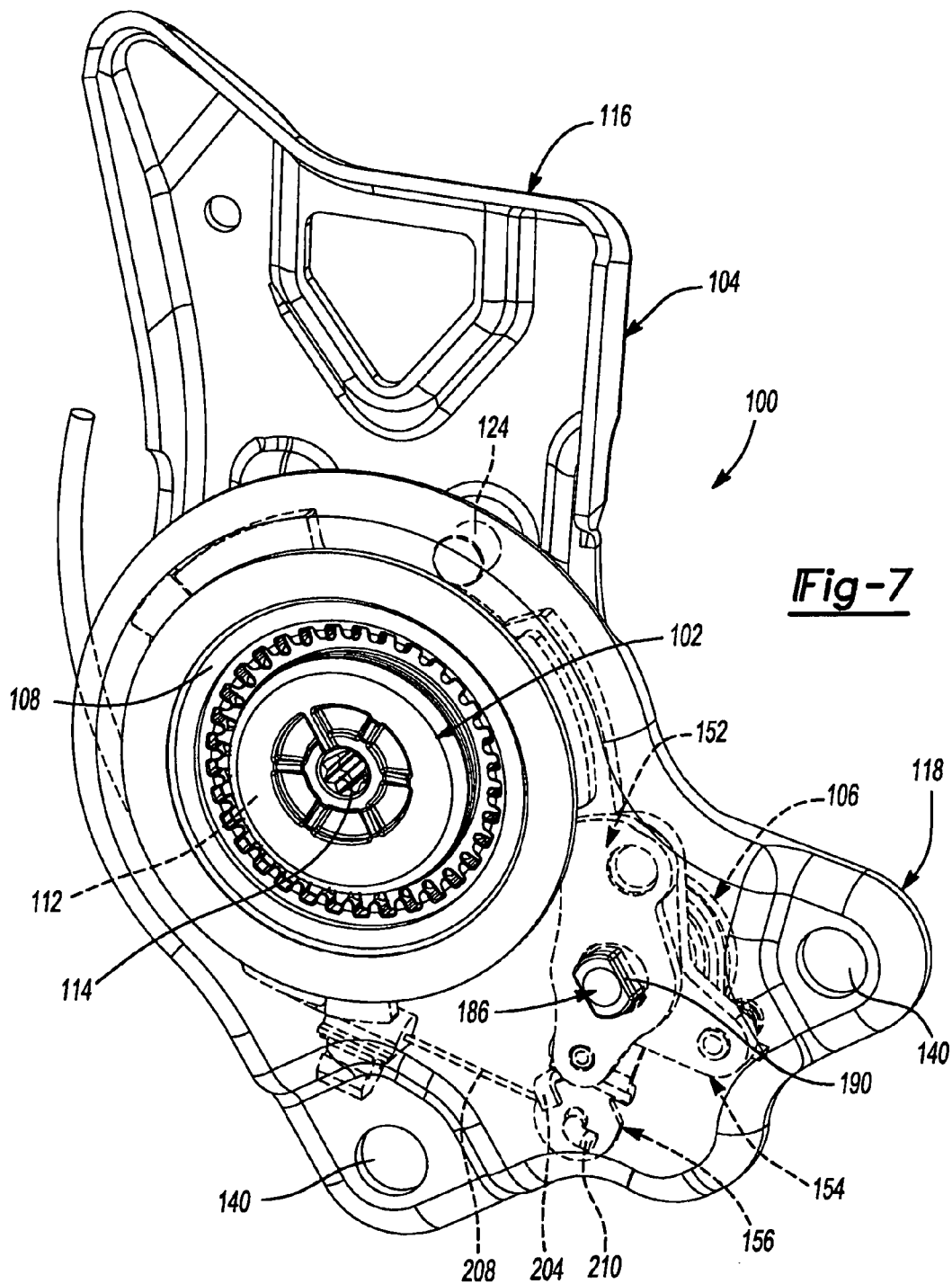
FIG. 7 is a perspective view of an adjustment mechanism in accordance with the principles of the present disclosure.
Figure 8:
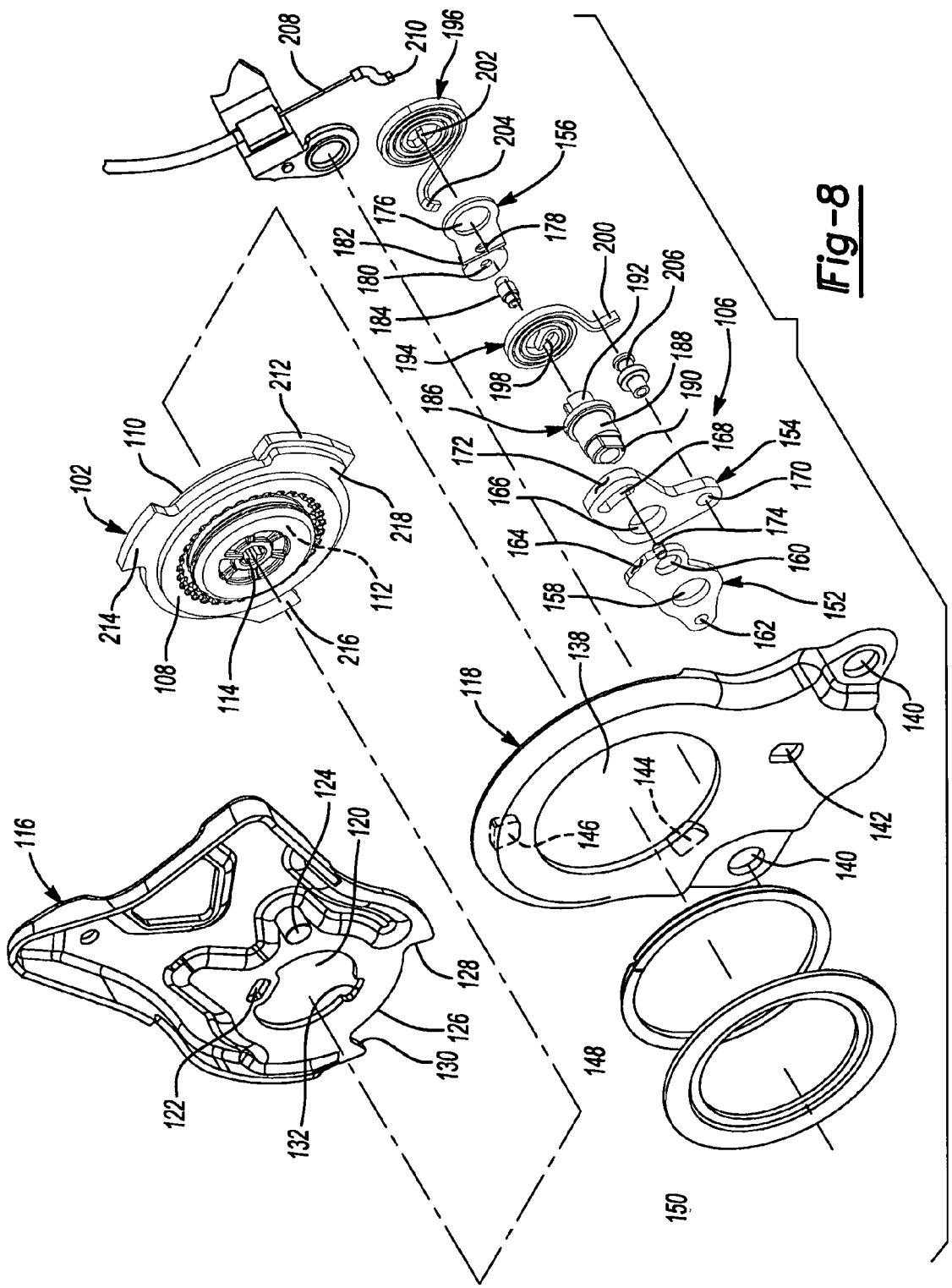
FIG. 8 is an exploded view of the adjustment mechanism of FIG. 7.
Figure 9:
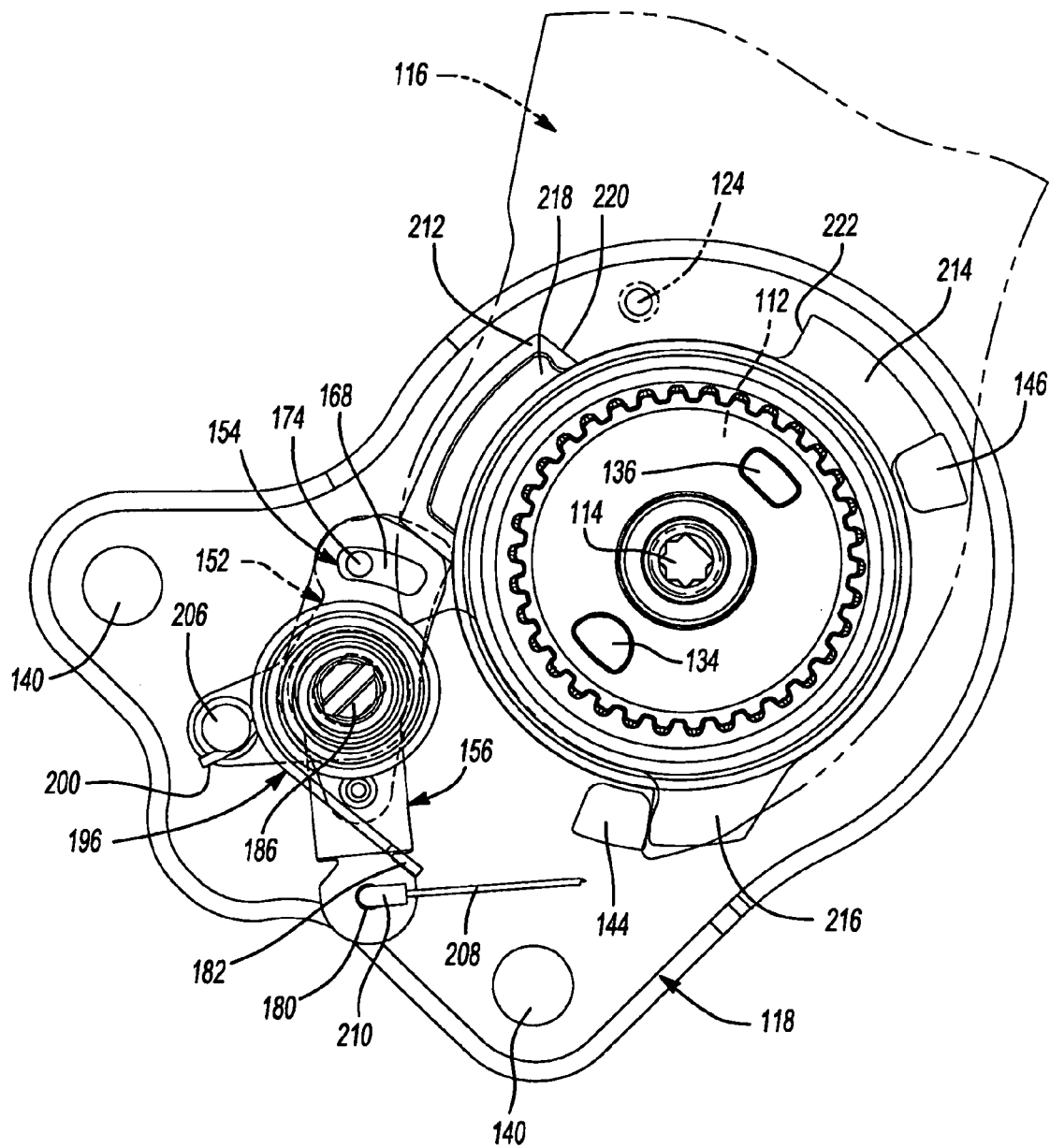
FIG. 9 is a side view of the adjustment mechanism of FIG. 7 with part of a housing removed to show internal components of the adjustment mechanism in a locked state.
Figure 10:
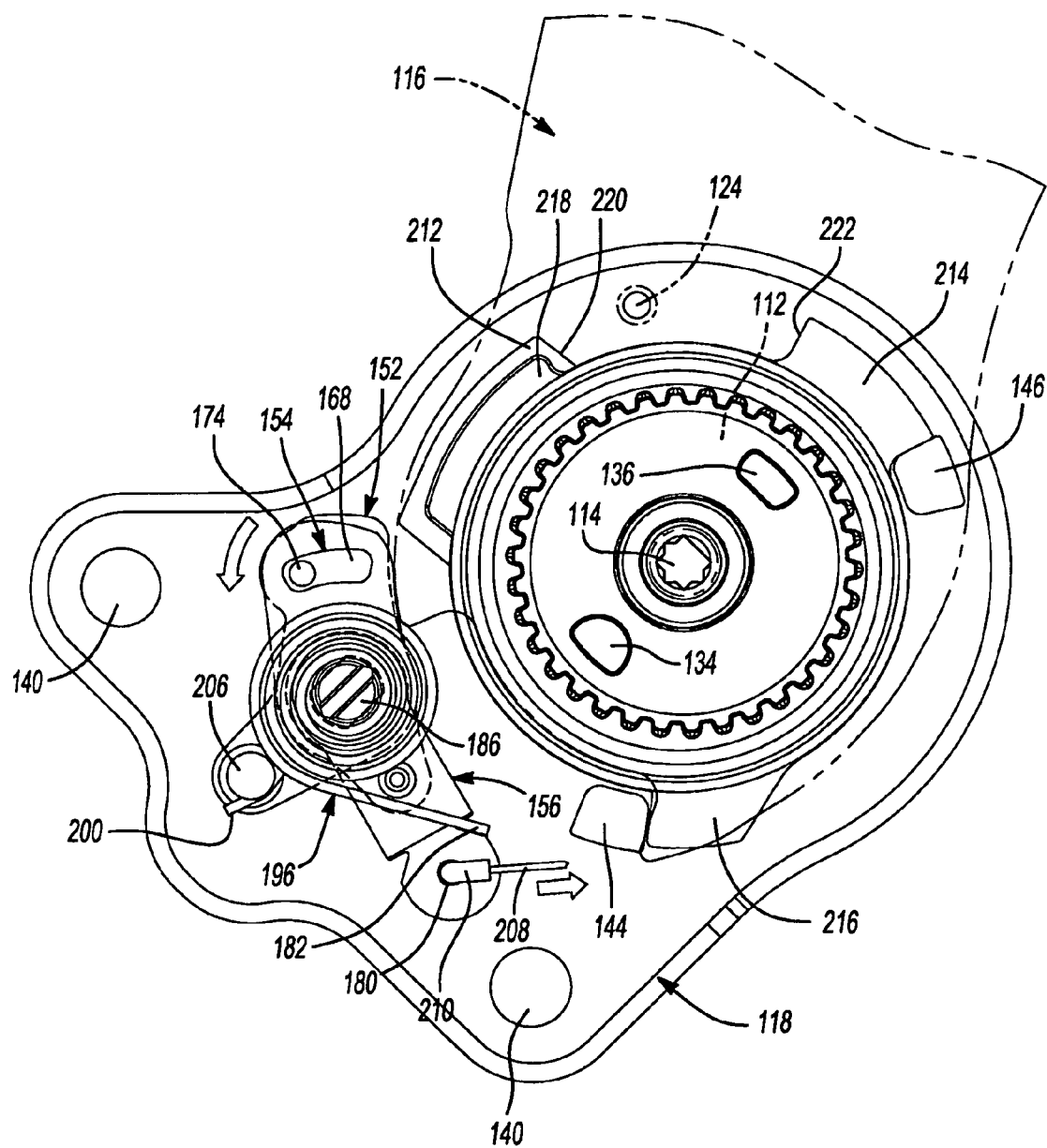
FIG. 10 is a side view of the adjustment mechanism of FIG. 7 with part of a housing removed to show internal components of the adjustment mechanism moving from a locked state to an unlocked state.
Figure 11:
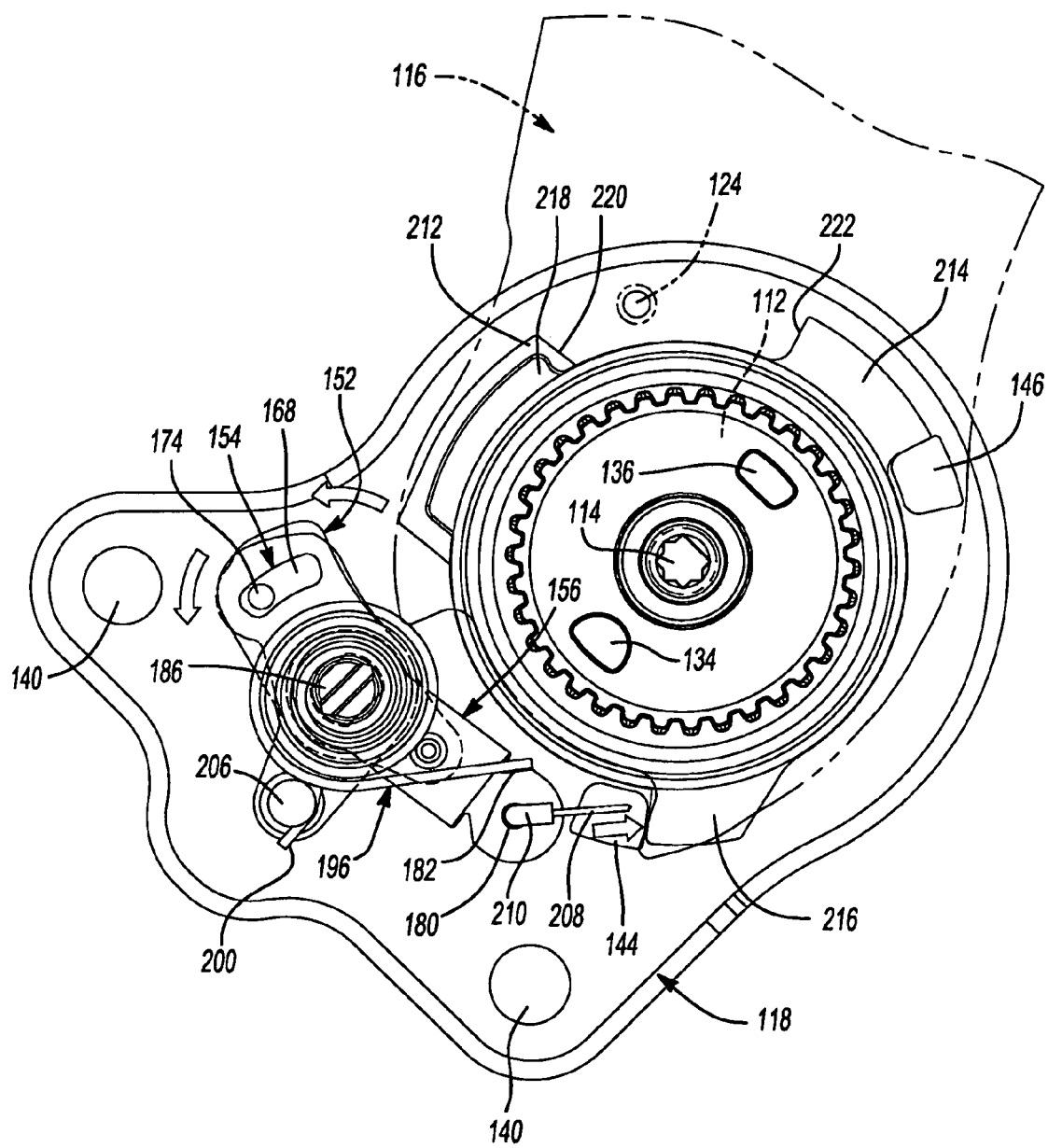
FIG. 11 is a side view of the adjustment mechanism of FIG. 7 with part of a housing removed to show internal components of the adjustment mechanism in an unlocked state.
Figure 12:
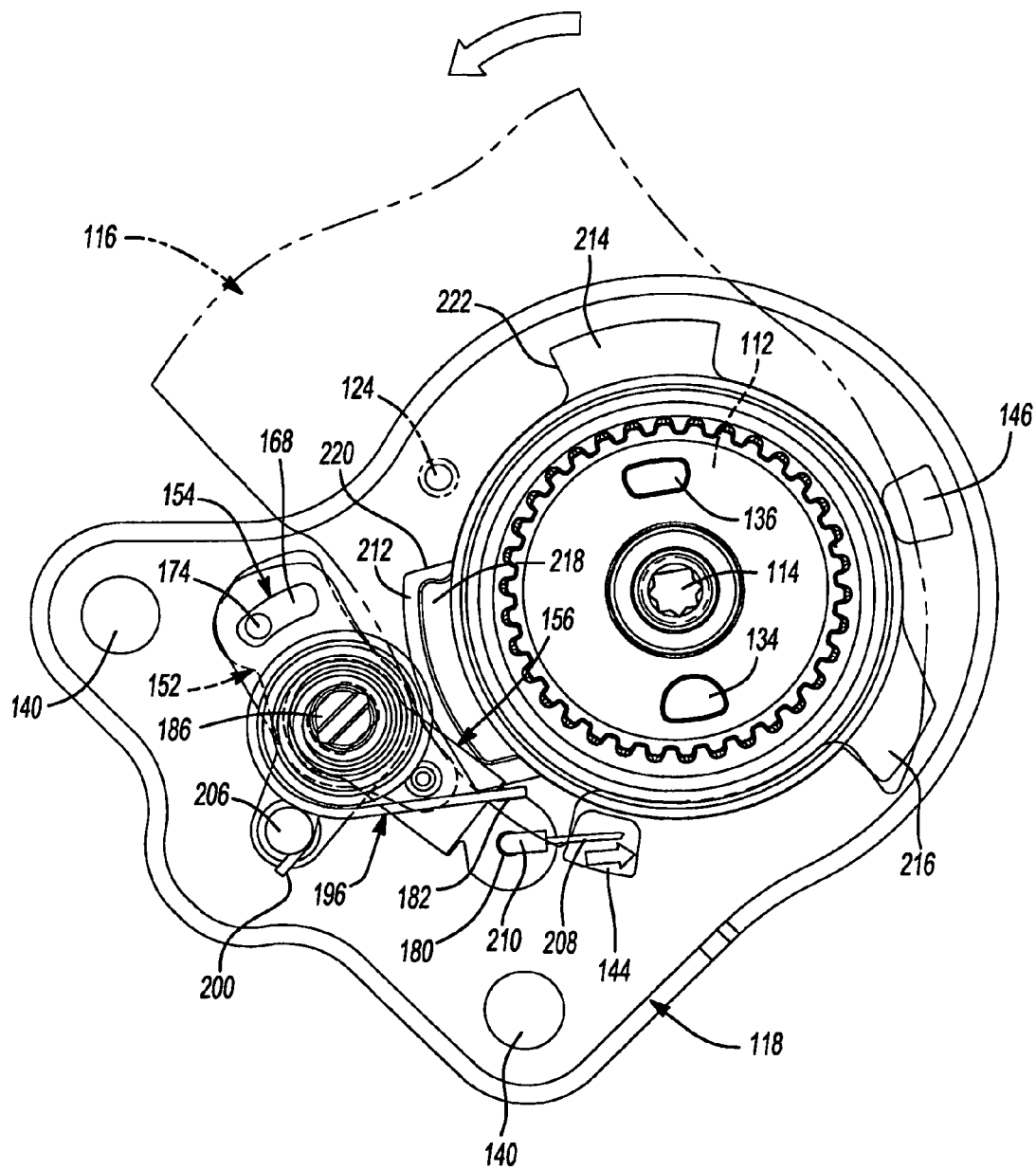
FIG. 12 is a side view of the adjustment mechanism of FIG. 7 with part of a housing removed to show internal components of the adjustment mechanism in an unlocked state and in an easy-entry position.
Figure 13:
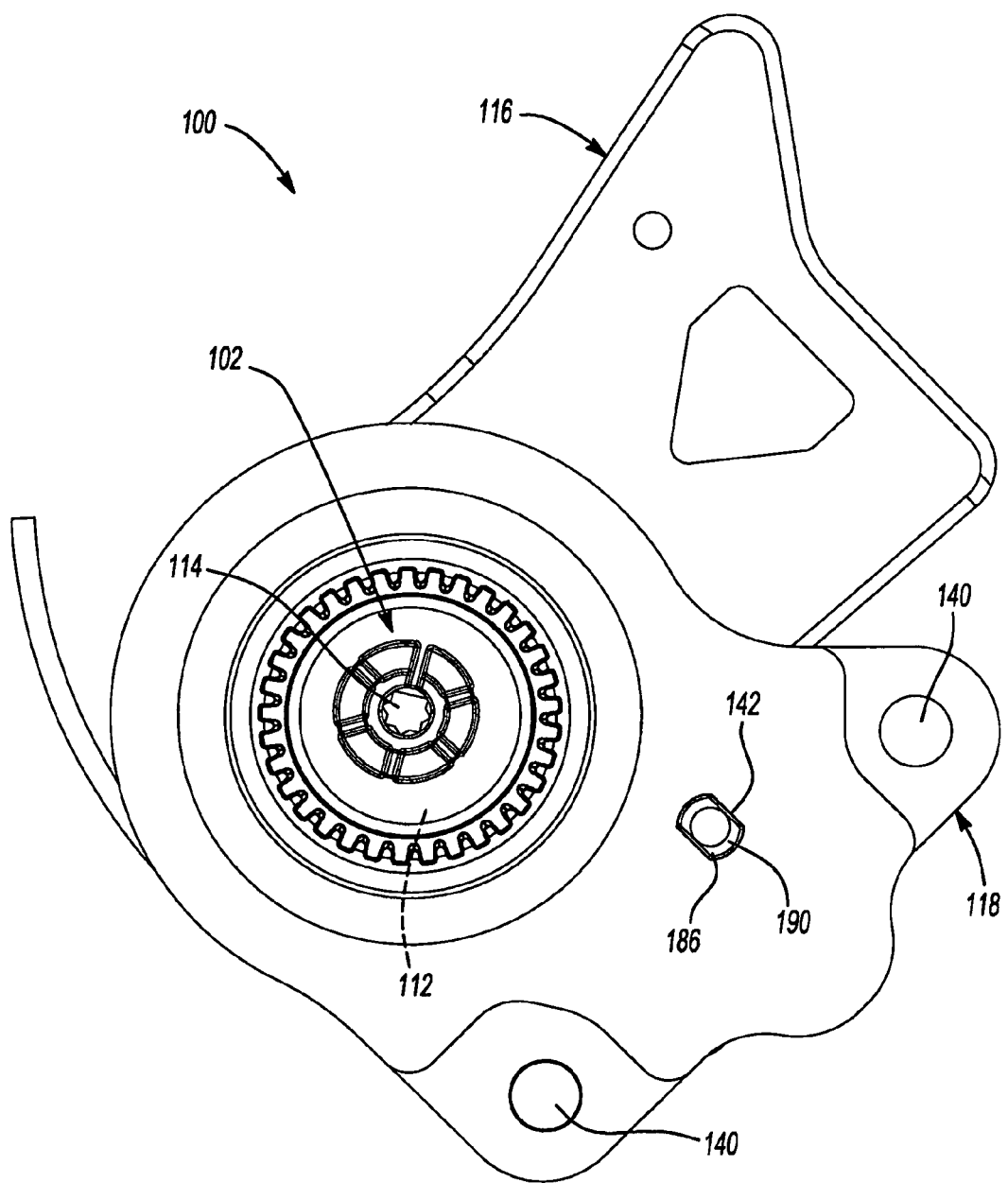
FIG. 13 is a perspective view of the adjustment mechanism of FIG. 7 in an easy-entry position.

With particular reference to FIGS. 7 and 8, the housing 104 is shown to include an upper housing plate 116 and a lower housing plate 118. The upper housing plate 116 may be fixed for movement with the first plate 108 of the recliner mechanism 102 such that the upper housing plate 116 rotates with the first plate 108 relative to the second plate 110. The upper housing plate 116 may include a central aperture 102, a keyed aperture 122, a post 124, and an opening 126 defining a first stop 128 and a second stop 130. The central aperture 120 may at least partially receive the first plate 108 of the recliner mechanism 102 and may include a keyed feature 132 that receives a key 134 of the first housing plate 108 (FIG. 9). Engagement between the key 134 of the first housing plate 108 and the keyed feature 132 of the central aperture 120 properly positions the recliner mechanism 102 relative to the upper housing plate 116. In addition to engagement between the key 134 and the keyed feature 132 of the central aperture 120, the keyed aperture 122 likewise may receive a key 136 of the first housing plate (FIG. 9) to both position the recliner mechanism 102 relative to the upper housing plate 116 and to prevent movement therebetween. Once the key 134 is received by the keyed feature 132 and the key 136 is received by the keyed aperture 122, the first plate 108 may be fixedly attached to the upper housing plate 116 via a weld or other suitable process. Such a weld may fixedly attach the key 134 to the keyed feature 132 and/or may fixedly attach the key 136 to the keyed aperture 122.

The lower housing plate 118 may include a central aperture 138, a pair of attachment apertures 140, a keyed aperture 142, and first and second stops 144, 146. The central aperture 138 may receive a bushing 148 at least partially therein and a retention collar 150. The bushing 148 may permit and facilitate rotation of the second plate 110 of the recliner mechanism 102 within and relative to the central aperture 138 while the retention collar 150 may cooperate with the lower housing plate 118 to retain and properly position the second plate 110 and, thus, the recliner mechanism 102, relative to the lower housing plate 118.

As shown in FIGS. 21 and 22, the upper housing plate 116 may be fixedly attached to the seatback 502 such that rotation of the upper housing plate 116 causes concurrent rotation of the seatback 502. Likewise, the lower housing plate 118 may be fixedly attached to the seat bottom 504 for movement therewith. The upper housing plate 116 may be fixedly attached to the seatback 502 via a series of fasteners (not shown) while the lower housing plate 118 may likewise be fixedly attached to the seat bottom 504 via a series of fasteners (not shown) received through the attachment apertures 140.

With continued reference to FIGS. 7 and 8, the locking mechanism 106 is shown to include a load cam 152, a tolerance-absorbing cam 154, and an actuation lever 156. The load cam 152 may include a central aperture 158, a first attachment aperture 160, a second attachment aperture 162, and an engagement surface 164. Likewise, the tolerance-absorbing cam 154 may include a central aperture 166, a slot 168, an attachment aperture 170, and an engagement surface 172. A pin 174 may be attached to the load cam 152 at the first attachment aperture 160 and may be slidably received within the slot 168 of the tolerance-absorbing cam 154. As will be described in greater detail below, engagement between the pin 174 and the slot 168 permits the tolerance-absorbing cam 154 to move relative to the load cam 152 and allows the load cam 152 to move the tolerance-absorbing cam 154 into an unlocked state.

The actuation lever 156 may include a central aperture 176, a first attachment aperture 178, a second attachment aperture 180, and a spring seat 182. The actuation lever 156 may be fixed for rotation with the load cam 152, as a pin or rivet may be received within the first attachment aperture 178 of the actuation lever 156 and within the second attachment aperture 162 of the load cam 152. Attaching the actuation lever 156 to the load cam 152 via the pin 184 fixes the actuation lever 156 for rotation with the load cam 152.

A pivot pin 186 may rotatably support the load cam 152, tolerance-absorbing cam 154, and actuation lever 156 relative to the lower housing plate 118. The pivot pin 186 may include a cylindrical body 188, a key 190, and a spring seat 192. The cylindrical body 188 may receive the central aperture 158 of the load cam 152, the central aperture 166 of the tolerance-absorbing cam 154, and the central aperture 176 of the actuation lever 156 to rotatably support the load cam 152, tolerance-absorbing cam 154, and actuation lever 156 relative to the lower housing plate 118. The pivot pin 186 may be fixed to the lower housing plate 118 by inserting the key 190 into the keyed aperture 142 of the lower housing plate 118. Because the key 190 is matingly received within the keyed aperture 142, relative rotation between the pivot pin 186 and the lower housing plate 118 is prevented.

The load cam 152 and the tolerance-absorbing cam 154 may be rotationally biased into a locked state and into engagement with the first plate 108 of the recliner mechanism 102 by a pair of biasing members 194, 196. The first biasing member 194 may include a first arm 198 and a second arm 200. Likewise, the second biasing member 196 may include a first arm 202 and a second arm 204. The first arm 198 of the first biasing member 194 and the first arm 202 of the second biasing member 196 are each attached to the spring seat 192 of the pivot pin 196 to fix the first arms 198, 202 of the biasing members 194, 196, respectively, to the pivot pin 196.

The second arm 200 of the first biasing member 194 may abut a pin 206 attached to the attachment aperture 170 of the tolerance-absorbing cam 154. Engagement between the second arm 200 of the first biasing member 194 and the pin 206 imparts a rotational force on the tolerance-absorbing cam 154 and rotationally biases the tolerance-absorbing cam 154 in the clockwise direction relative to the view shown in FIG. 9. The second arm 204 of the second biasing member 196 may be received by the spring seat 182 of the actuation lever 156 and imparts a rotational force on the actuation lever 156 to rotationally bias the actuation lever 156 in the clockwise direction relative to the view shown in FIG. 9. Because the actuation lever 156 is fixed for rotation with the load cam 152 via the pivot 184, biasing the actuation lever 156 in the clockwise direction relative to the view shown in FIG. 9 likewise biases the load cam 152 in the clockwise direction relative to the view shown in FIG. 9.

As described, the first biasing member 194 imparts a rotational force on the tolerance-absorbing cam 154 and the second biasing member 196 imparts a rotational force on the load cam 152 via the actuation lever 156. Because the biasing members 194, 196 are independent from one another, the rotational force imparted on the tolerance-absorbing cam 154 and the rotational force imparted on the load cam 152 are separate and apart from one another. As such, biasing members 194, 196 of different spring rates may be used to adjust the forces applied to each of the load cam 152 and tolerance-absorbing cam 154 independent from one another.

A cable 208 may be provided to selectively rotate the cams 152, 154 relative to the lower housing plate 118 and may include a distal end 210 attached to the second attachment aperture 180 of the actuation lever 156. Attaching the cable 208 to the actuation lever 156 allows the cable 208 to impart a force on the actuation lever 156 when the cable 208 is subjected to a tensile force. Applying a force on the actuation lever 156 at the second attachment aperture 180 causes the actuation lever 156 to rotate about the central aperture 176 of the actuation lever 156 and relative to the lower housing plate 118.

With particular reference to FIGS. 9-13, 21, and 22, operation of the adjustment mechanism 100 will be described in detail. The locking mechanism 112 prevents relative rotation between the first plate 108 and the second plate 110 until a force is supplied via the crossrod. Because the first plate 108 is fixed for movement with the upper housing plate 116, movement of the upper housing plate 116 relative to the second plate 110 is likewise prevented.

A force may be applied to the locking mechanism 112 via the crossrod and the keyed aperture 114 of the recliner mechanism 102 to move the first plate 108 relative to the second plate 110. Once the force is supplied via the crossrod, relative rotation between the first plate 108 and the second plate 110 is accomplished. Because the first plate 108 is fixed for movement with the upper housing plate 116, permitting movement of the first plate 108 relative to the second plate 110 likewise causes movement of the upper housing plate 116 relative to the second plate 110. Further, because the upper housing plate 116 is attached to the seatback 502, movement of the upper housing plate 116 relative to the second plate 110 likewise causes movement of the seatback 502 relative to the second plate 110 and relative to the lower housing plate 118 and seat bottom 504.

The second plate 110 is not fixed to the lower housing plate 118 but, rather, is permitted to rotate relative to the lower housing plate 118. However, engagement between the load cam 152 and the tolerance-absorbing cam 154 and the second plate 110 prevents relative rotation between the second plate 110 and the lower housing plate 118 when the load cam 152 and tolerance-absorbing cam 154 are engaged with the second plate 110. Specifically, the second plate 20 may include a first projection 212, a second projection 214, and a third projection 216, whereby the first projection 212 is in engagement with the engagement surface 172 of the tolerance-absorbing cam 154. Engagement between the engagement surface 172 of the tolerance-absorbing cam 154 and the first projection 212 prevents the second plate 110 from rotating relative to the lower housing plate 118 and, as such, fixes the position of the second plate 110 relative to the lower housing plate 118 when the first plate 108, upper housing plate 116, and seatback 502 rotate relative to the second plate 110, lower housing plate 118, and seat bottom 504 (i.e., when the locking mechanism 112 of the recliner mechanism 108 is in the unlocked state and prevents relative rotation between the first plate 108 and the second plate 110).

While the engagement surface 172 of the tolerance-absorbing cam 154 is described as being in contact with the first projection 212, the engagement surface 164 of the load cam 152 may likewise be in contact with the first projection 212 at a shoulder 218 of the first projection 212. The shoulder 218 may extend from the first projection 212 to properly oppose the engagement surface 164 of the load cam 152. As such, the tolerance-absorbing cam 154 may oppose and engage the shoulder 218 while the load cam 152 may likewise oppose and engage the first projection 212, but does so at the projection 218.

Rotation of the first plate 108 relative to the second plate 110 is permitted within a range of motion defined generally between the first projection 212 and the second projection 214. Specifically, the first projection 212 may define a first stop 220 while the second projection 214 may define a second stop 224. The post 124 of the upper housing plate 116 may engage the first stop 220 to define a forward-most angled position of the seatback 502 relative to the seat bottom 504 and may likewise engage the second stop 222 to define a rearward-most angled position of the seatback 502 relative to the seat bottom 504.

Once the desired angled position of the seatback 502 relative to the seat bottom 504 is achieved, the force applied to the keyed aperture 114 via the crossrod may be removed and the locking mechanism 112 of the recliner mechanism 108 may once again fix the relative position of the upper first plate 108, upper housing plate 116, and seatback 502 relative to the second plate 110, lower housing plate 118, and seat bottom 504. At this point, the upper housing plate 116 and seatback 502 are prevented from rotating relative to the lower housing plate 118 and seat bottom 504 due to the locking mechanism 112 and due to engagement between the tolerance-absorbing cam 154 and the first projection 212 of the second plate 110.

The locking mechanism 106 provides the actuation mechanism 100 with a so-called easy-entry feature that allows the upper housing plate 116 and seatback 502 to be quickly rotated into a easy-entry or forward position (FIGS. 12, 13, and 22) relative to the lower housing plate 118 and seat bottom 504. When the upper housing plate 116 and seatback 502 are rotated into the easy-entry position relative to the lower housing plate 118 and seat bottom 504, the recliner mechanism 102 is similarly rotated along with the upper housing plate 116 and seatback 502 while the locking mechanism 112 is in the locked state and prevents relative rotation between the first plate 108 and the second plate 110. As such, the first plate 108 and the second plate 110 rotate with the upper housing plate 116 and seatback 502 relative to the lower housing plate 118 and seat bottom 504. The relative position between the first housing plate 108 and second housing plate 110 is fixed, as the locking mechanism 112 is maintained throughout movement of the upper housing plate 116 and seatback 502 into the easy-entry position relative to the lower housing plate 118 and seat bottom 504.

Movement of the actuation mechanism 110 into the easy-entry position may be accomplished by applying a tensile force to the cable 208 to cause the actuation lever 156 to rotate in the counter-clockwise direction relative to the view shown in FIG. 9. Sufficient rotation of the actuation lever 156 in the counter-clockwise direction relative to the view shown in FIG. 9 causes concurrent counter-clockwise rotation of the load cam 152 and disengagement of the load cam 152 from the shoulder 218 of the second plate 110. Sufficient rotation of the actuation lever 156 in the counter-clockwise direction relative to the view shown in FIG. 9 also causes the pin 174 to move within the slot 168 and engage a distal end of the slot 168 to cause the tolerance-absorbing cam 154 to likewise rotate in the counter-clockwise direction relative to the view shown in FIG. 9. Sufficient rotation of the tolerance-absorbing cam 154 in the counter-clockwise direction relative to the view shown in FIG. 9 causes the tolerance-absorbing cam 154 to disengage the first projection 212 of the second plate 110. Once the load cam 152 and tolerance-absorbing cam 154 are disengaged from the second plate 110, the recliner mechanism 102 including the first plate 108 and second plate 110 may be rotated with the upper housing plate 116 relative to the lower housing plate 118 and seat bottom 504 to position the seatback 502 in the easy-entry position.

Upon release of the tensile force applied to the actuation lever 156 via the cable 208, the biasing members 194, 196 will once again respectively bias the load cam 152, tolerance-absorbing cam 154, and actuation lever 156 in the clockwise direction relative to the view shown in FIG. 9. As such, when a force is applied to the seatback 502 to rotate the seatback 502 relative to the seat bottom 504 and into a usable position (FIG. 21), the engagement surface 164 of the load cam 152 may once again engage the shoulder 218 of the second plate 110 and the engagement surface 172 of the tolerance-absorbing cam 154 may once again engage the projection 212 of the second plate 110 to prevent rotation of the second plate 110 relative to the lower housing plate 118. Once the seatback 502 is returned to the upright position, the position of the seatback 502 relative to the seat bottom 504 will be returned to the same angle that the seatback 502 was positioned relative to the seat bottom 504 prior to the seatback 502 being moved into the easy-entry position. The same angle of the seatback 502 relative to the seat bottom 504 is achieved, as the locking mechanism 106 of the recliner mechanism 102 remains in the locked state prior to, during, and after rotation of the seatback 502 into the easy-entry position. Because the locking mechanism 112 of the recliner mechanism 102 is in the locked state and remains in the locked state when the seatback 502 is moved into the easy-entry position, the relative position of the first plate 108 and the second plate 110 is fixed. As such, when the seatback 502 is returned to an upright position, the position of the post 124 relative to the stops 220, 222 is returned to the same position and therefore positions the seatback 502 at the same angle relative to the seat bottom 504 when the seatback 502 is returned to the upright position.

Once the seatback 502 is moved into the upright position (FIG. 21), the second projection 214 and third projection 216 of the second plate 110 may respectively engage the stops 146, 144 of the lower housing plate 118. Engagement between the projections 214, 216 and the respective stops 146, 144 limit the travel of the seatback 502 relative to the seat bottom 504 and define the range of motion of the seatback 502 relative to the seat bottom 504, as the seatback 502 is returned to an upright position from the easy-entry position.

Once tolerance-absorbing cam 154 is engaged with the second plate 110, the seatback 502 is once again prevented from rotating relative to the seat bottom 504 until the locking mechanism 112 of the recliner mechanism 102 is once again moved into the unlocked state or the locking mechanism 106 is moved into the unlocked state. In this position, the tolerance-absorbing cam 154 engages the first projection 212 of the second plate 110 to prevent rotation of the second plate 110 relative to the lower housing plate 118 while the load cam 152 may or may not be engaged with the second plate 110.

The load cam 152 may not be engaged with the shoulder 218 of the second plate 110 but, rather, may be disposed in close proximity to the projection 218 to aid the tolerance-absorbing cam 154 in restricting rotation of the second plate 110 relative to the lower housing plate 118 should a sufficiently high and/or continuous force be applied to the upper housing plate 116. Specifically, the tolerance-absorbing cam 154 is permitted to engage the projection 212 and is permitted to rotate relative to the load cam 152, as the slot 168 of the tolerance-absorbing cam 154 provides sufficient clearance relative to the post 174 to allow the tolerance-absorbing cam 154 to securely engage the first projection 212 of the second plate 110. Allowing the tolerance-absorbing cam 154 to rotate relative to the load cam 152 and securely engage the first projection 212 of the second plate 110 accounts for any manufacturing variance among the components of the adjustment mechanism 100 and reduces noise associated with relative movement and/or vibration of the components of the adjustment mechanism 100 during use. However, should the adjustment mechanism 100 be subjected to a sufficiently high and/or continuous force, the tolerance-absorbing cam 154 may rotate in the counter-clockwise direction relative to the view shown in FIG. 9, thereby allowing the second plate 110 to rotate slightly relative to the lower housing plate 118. Because the load cam 152 is positioned adjacent to the shoulder 218 of the second plate 110, further rotation is prevented once the shoulder 218 rotates sufficiently and engages the load cam 152. At this point, the forces exerted on the adjustment mechanism 100 are received by the load cam 152 and are transmitted into the lower housing plate 118 and surrounding structure via engagement between the load cam 152 and the pivot pin 186.

With particular reference to FIGS. 14-20, another adjustment mechanism 300 in accordance with the principles of the present disclosure is provided. The adjustment mechanism 300 may include a recliner mechanism 302, a housing 304, and a locking mechanism 306. As with the adjustment mechanisms 10, 100, the locking mechanism 306 is a so-called easy-entry mechanism that selectively permits the seatback 502 to be moved into an easy-entry or forward position relative to the seat bottom 504.

Figure 14:
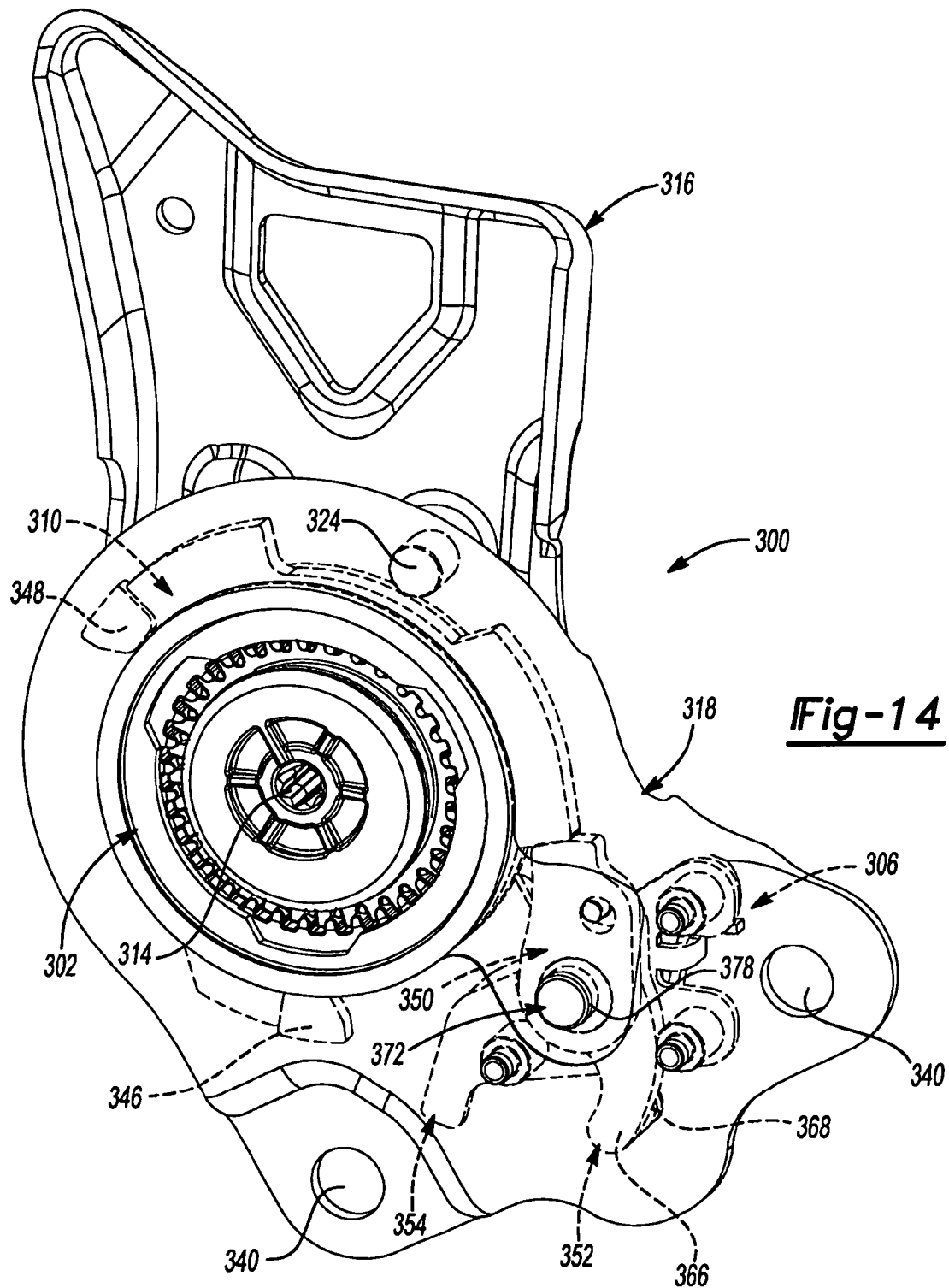
FIG. 14 is a perspective view of an adjustment mechanism in accordance with the principles of the present disclosure.
Figure 15:
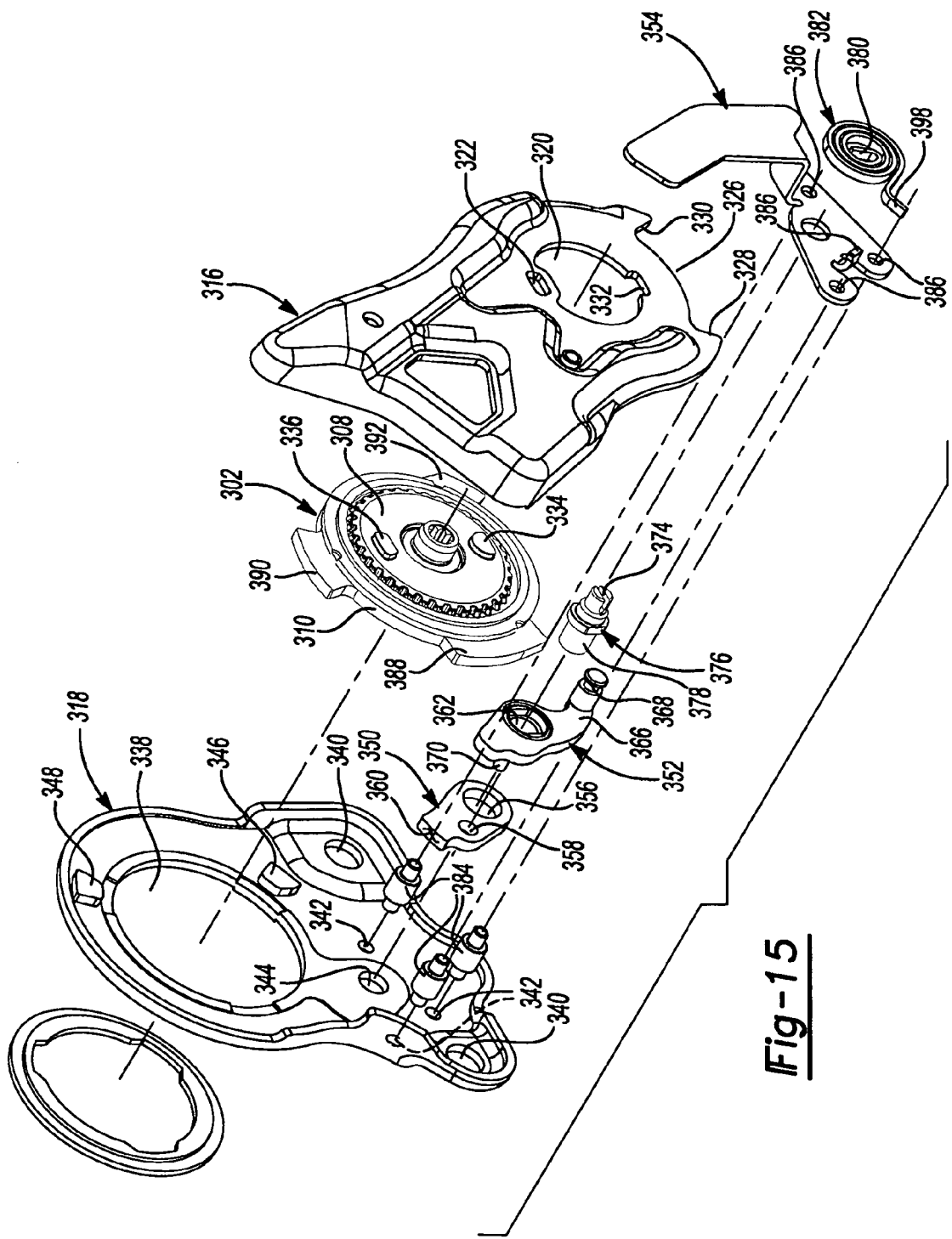
FIG. 15 is an exploded view of the adjustment mechanism of FIG. 14.

With particular reference to FIGS. 14 and 15, the recliner mechanism 302 may be a continuous recliner mechanism and may include a first plate 308, a second plate 310, and a locking mechanism 312. The recliner mechanism 302 may be a continuous or constantly engaged recliner mechanism that is either manually actuated or is actuated via a motor. Conversely, the recliner mechanism 302 may be a discontinuous mechanism movable between a locked state and an unlocked state either manually or via a powered unit (not shown). While the recliner mechanism 302 can be either a continuous recliner mechanism or a discontinuous mechanism, the recliner mechanism 302 will be described and shown as being a continuous recliner mechanism.

The locking mechanism 312 may be disposed generally between the first plate 308 and the second plate 310 and may selectively fix a position of the first plate 308 relative to the second plate 310. The recliner mechanism 302 may additionally include a keyed aperture 314 for receiving a crossrod (not shown), whereby the crossrod may impart a rotational force on the locking mechanism 312 to move the first plate 308 relative to the second plate 310.

The housing 304 may include an upper housing plate 316 and a lower housing plate 318. The upper housing plate 316 may be fixed for movement with the first plate 308 and may include a central aperture 320, a keyed aperture 322, a post 324, and an opening 326 defining a first stop 328 and a second stop 330. The central aperture 320 may include a keyed feature 332 that matingly receives a key 334 of the recliner mechanism 302. Engagement between the key 334 and the keyed feature 332 of the upper housing plate 312 properly positions the recliner mechanism 302 relative to the upper housing plate 316. The recliner mechanism 302 may additionally include a key 336 that is matingly received within the keyed aperture 322 of the upper housing plate 316 to further position the recliner mechanism 302 relative to the upper housing plate 316. Once the key 334 is received by the keyed feature 332 and the key 336 is received by the keyed aperture 322, the first plate 308 of the recliner mechanism 302 may be welded or otherwise fixedly attached to the upper housing plate 316 for movement therewith.

The lower housing plate 318 may include a central aperture 338, a series of first attachment apertures 340, a series of second attachment apertures 342, and a pivot aperture 344. The lower housing plate 318 may also include a first stop 346 and a second stop 348 that are in selective engagement with the recliner mechanism 302 to define a range of motion of the recliner mechanism 302 relative to the lower housing plate 318, as will be described in greater detail below.

Figure 16:
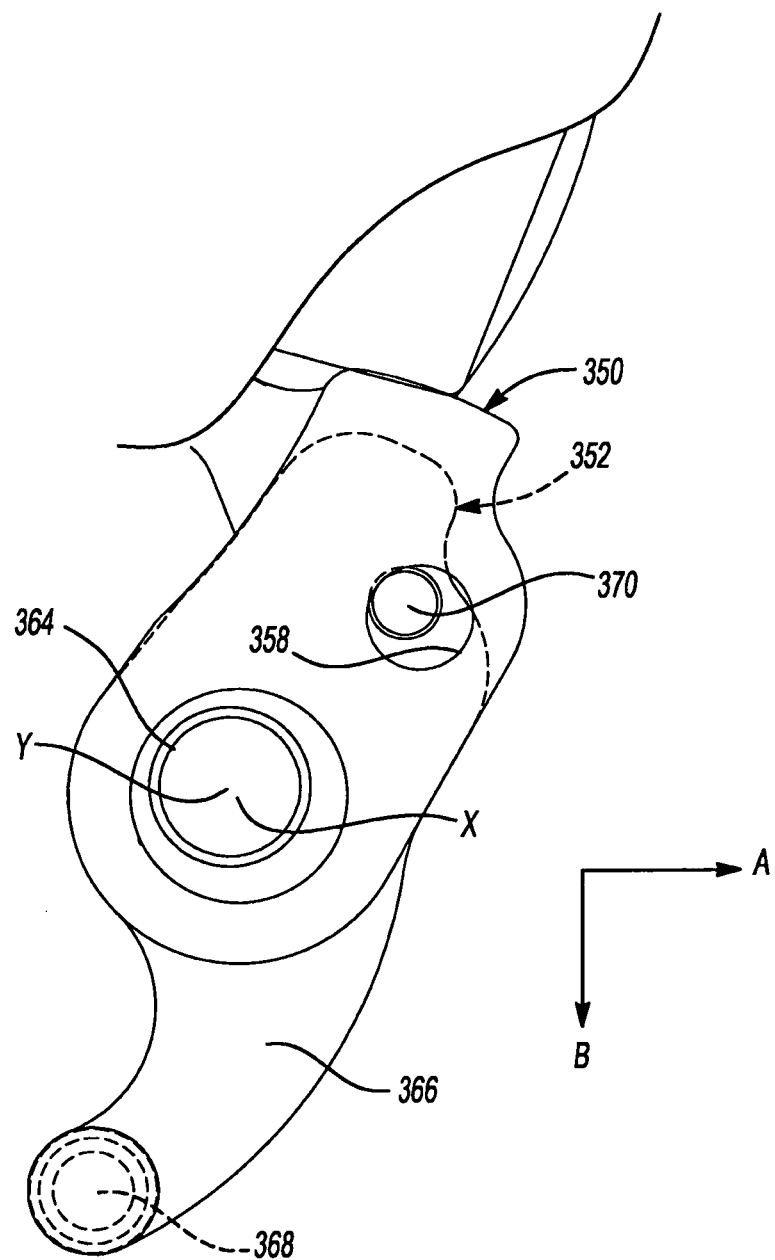
FIG. 16 is a side view of a cam of the adjustment mechanism of FIG. 14.
Figure 17:
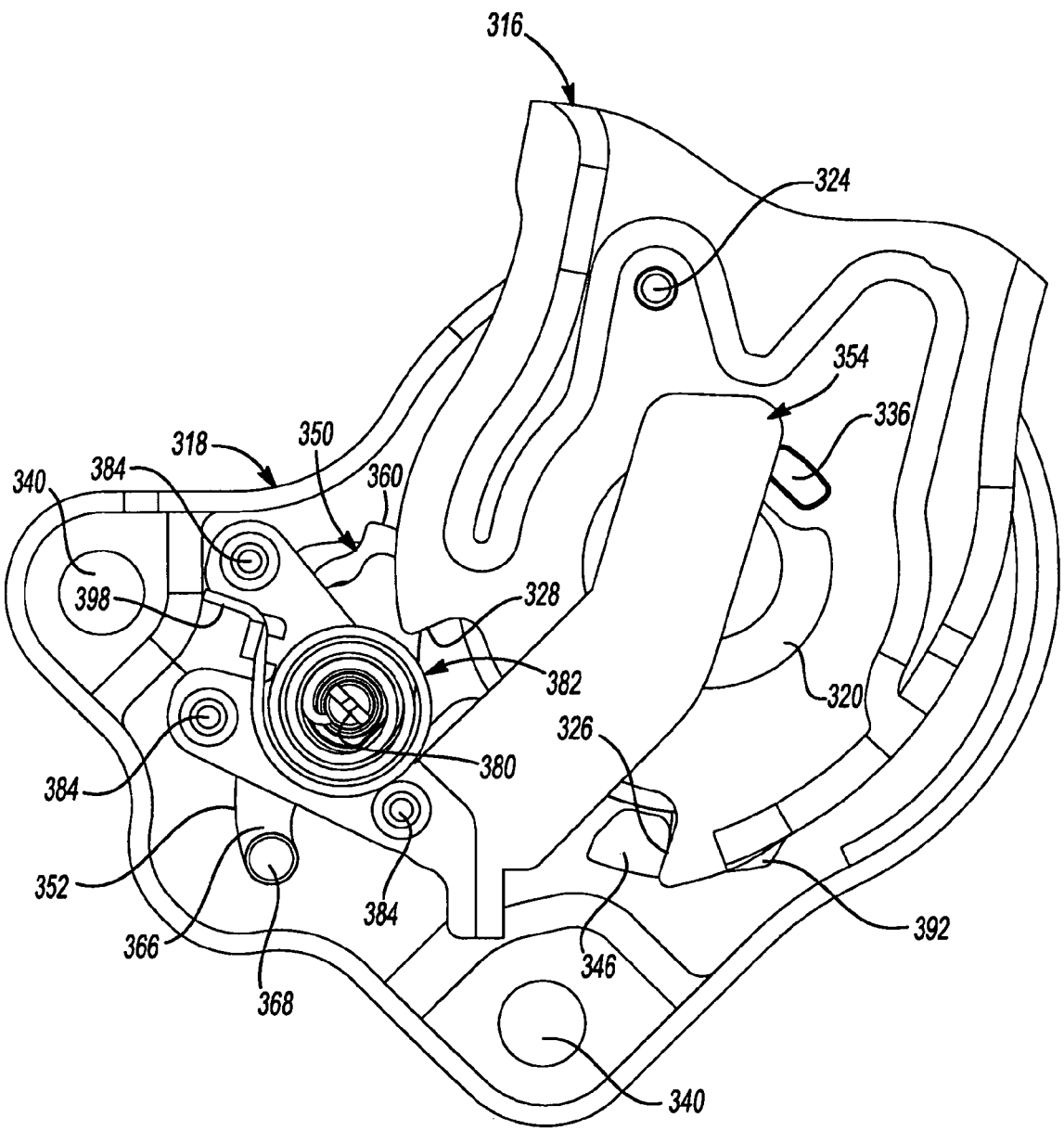
FIG. 17 is a side view of the adjustment mechanism of FIG. 14 with part of a housing removed to show internal components of the adjustment mechanism in a locked state.

With particular reference to FIGS. 14-16, easy-entry or locking mechanism 306 may include a locking cam 350, an eccentric cam 352, and a bracket 354. The locking cam 350 may include a central aperture 356, a post aperture 358, and an engagement surface 360.

The eccentric cam 352 may include a keyed aperture 362, a projection 364, an extension 366, a cable seat 368, and a post 370. The keyed aperture 362 may include an axis of rotation (X) that is offset from an axis of rotation (Y) of the projection 364 such that the projection 364 is eccentric to the keyed aperture 362 (FIG. 16).

The locking cam 350 and eccentric cam 352 may be rotatably supported relative to the lower housing plate 318 by a pivot pin 372. The pivot pin 372 may include a spring seat 374, a key portion 376, and a cylindrical portion 378. The spring seat 374 may receive a central portion 380 of a biasing member 382 while the key portion 376 may be matingly received by the keyed aperture 362 of the eccentric cam 352. The cylindrical portion 378 may extend from the key portion 376 and may be rotatably received by the central aperture 356 of the locking cam 350 such that the locking cam 350 is supported relative to the lower housing plate 318 via the central portion 378 of the pivot pin 372.

As described above, the axis of rotation (X) of the keyed aperture 362 is eccentric to the axis of rotation (Y) of the projection 364. As such, when a force is applied to the eccentric cam 352 in a clockwise direction relative to the view shown in FIG. 16, the eccentric cam 352 rotates about axis (X) while the projection 364 rotates about axis (Y). Rotating the projection 364 about axis (Y) causes the post 370 to move within the post aperture 358 of the locking cam 350 until the post 370 contacts the locking cam 350 and similarly causes the locking cam 350 to rotate in the clockwise direction. Because the locking cam 350 is rotatably supported by the projection 364, the locking cam 350 moves in the (A) and (B) directions simultaneously when the locking cam 350 is rotated with the projection 364 due to engagement between the post 370 and the post aperture 358.

The bracket 354 may be positioned adjacent to the eccentric cam 352 such that the eccentric cam 352 and locking cam 350 are disposed generally between the lower housing plate 318 and the bracket 354. The bracket 354 may be secured to the lower plate via a series of posts 384, whereby the rivets 384 are fixedly attached to the attachment apertures 342 of the lower housing plate 318. Specifically, the posts 384 may be fixedly attached to the lower housing plate 318 at the attachment apertures 342 and may be attached to the mounting bracket at attachment apertures 386 of the bracket 354 to secure and position the bracket 354 relative to the lower housing plate 318. The bracket 354 may also include spring seat 386 that receives a portion of the biasing member 382.

With particular reference to FIGS. 18-22, operation of the adjustment mechanism 300 will be described in detail. When the seatback 502 is in an upright and usable position relative to the seat bottom 504 (FIG. 21), the locking mechanism 312 of the recliner mechanism 302 prevents relative rotation between the first plate 308 and the second plate 310. Because the first plate 308 is fixed for movement with the upper housing plate 316 and the lower housing plate 318 is prevented from rotating relative to the lower housing plate 318 by the locking mechanism 306 when the locking mechanism 306 is in a locked state, preventing relative rotation between the first plate 308 and the second plate 310 when the locking mechanism 312 is in the locked state likewise prevents relative rotation between the upper housing plate 316 and the lower housing plate 318.

As with the adjustment mechanisms 10, 100, the upper housing plate 316 may be fixed to the seatback 502 such that the upper housing plate 316 is fixed for movement with the seatback 502. Likewise, the lower housing plate 318 may be fixed to the seat bottom 504 such that the lower housing plate 318 is fixed for movement with the seat bottom 504. Therefore, preventing relative rotation between the first plate 308 and upper housing plate 316 relative to the second plate 310 and lower housing plate 318 likewise prevents relative rotation between the seatback 502 and the seat bottom 504.

A rotational force may be applied to the keyed aperture 314 of the recliner mechanism 302 via the crossrod to move the first plate 308 relative to the second plate 310, thereby causing relative rotation between the upper housing plate 316 and lower housing plate 318. Permitting relative rotation between the upper housing plate 316 and lower housing plate 318 likewise permits relative rotation between the seatback 502 and the seat bottom 504.

Once a desired angular position of the seatback 502 relative to the seat bottom 504 is achieved, the force applied to the seatback 502 via the crossrod and aperture 314 may be removed to allow the locking mechanism 312 to once again prevent relative rotation between the first plate 308 and the second plate 310. Returning the locking mechanism 312 to the locked state allows the locking mechanism 312 to fix the position of the seatback 502 relative to the seat bottom 504 to maintain the adjusted position of the seatback 502 relative to the seat bottom 504 until a force is once again applied to the keyed aperture 314 to move the first plate 308 relative to the second plate 310.

Figure 18:
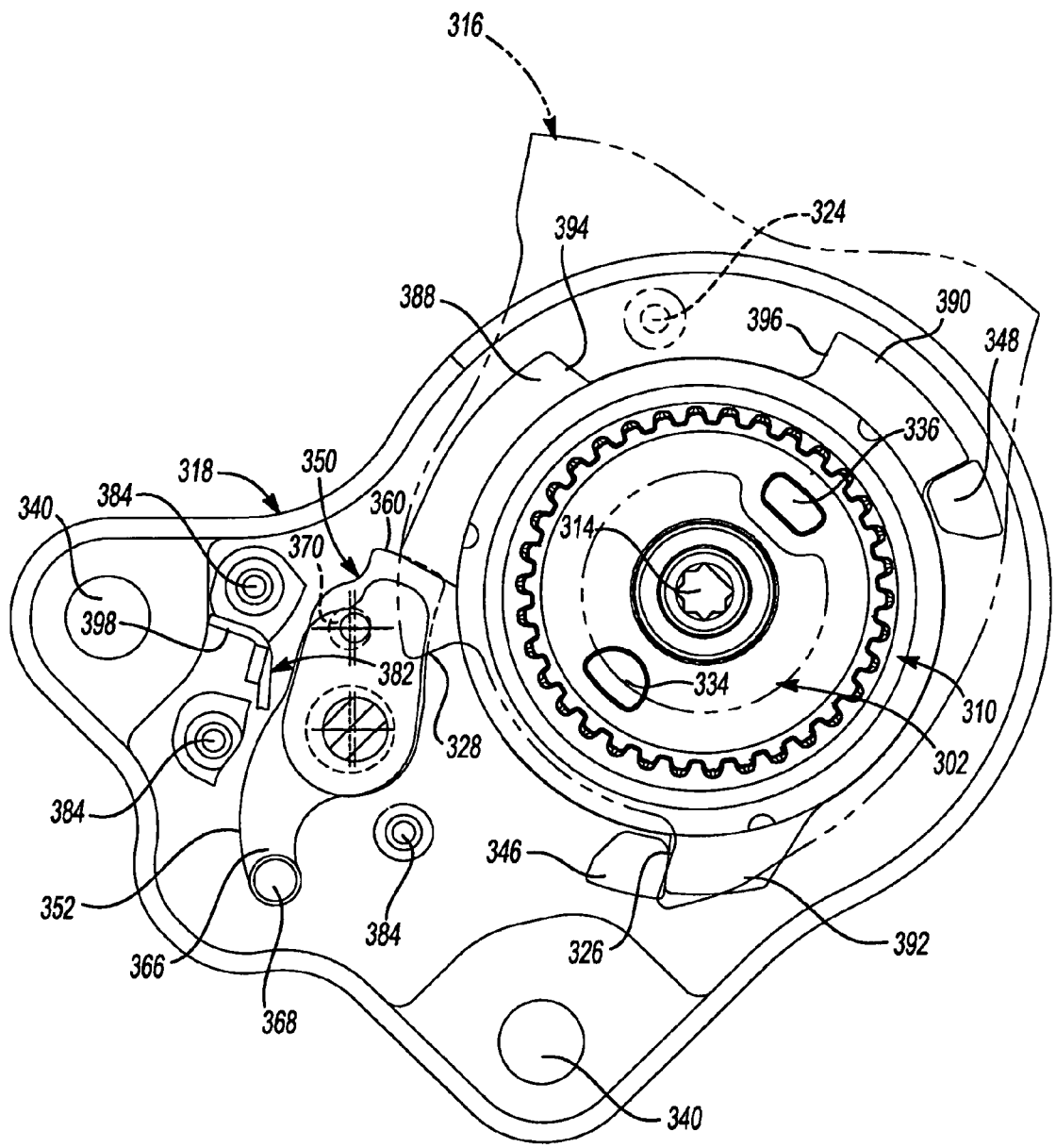
FIG. 18 is a side view of the adjustment mechanism of FIG. 14 with part of a housing removed to show internal components of the adjustment mechanism in a locked state.

As shown in FIG. 18, the second plate 310 may include a first projection 388, a second projection 390, and a third projection 392. The first projection 388 and second projection 390 may cooperate to define a range of motion of the first plate 308 relative to the second plate 310 and, thus, a range of motion of the seatback 502 relative to the seat bottom 504. Specifically, the first projection 388 may define a first stop 394 while the second projection 390 may define a second stop 396. The post 324 of the upper housing plate 316 may be permitted to move generally between the first projection 388 and the second projection 390 and may engage the first stop 394 to define a forward-most angular position of the seatback 502 relative to the seat bottom 504 and may engage the second stop 396 to define a rearward-most angular position of the seatback 502 relative to the seat bottom 504.

The angular position of the seatback 502 relative to the seat bottom 504 may be adjusted when the locking mechanism 306 is in a locked state and engages the second plate 310, thereby preventing rotation of the second plate 310 relative to the lower housing plate 318. The locking mechanism 306 is moved into the locked state by the biasing member 382, which exerts a rotational force on the pivot pin 372 due to engagement between the central portion 380 of the biasing member 382 and the pivot pin 372 as well as engagement between an arm 398 of the biasing member 382 and the bracket 354 at spring seat 386.

Rotationally biasing the pivot pin 372 likewise biases the eccentric cam 352 in the clockwise direction relative to the view shown in FIG. 18. Movement of the eccentric cam 352 in the clockwise direction causes the post 370 to move within the post aperture 358 until the post 370 contacts the locking cam 350 to likewise rotate the locking cam 350 relative to the lower housing plate 318 and into engagement with the first projection 388 of the second plate 310. Engagement between the engagement surface 360 of the locking cam 350 and the first projection 388 of the second plate 310 moves the locking mechanism 306 into the locked state and prevents rotation of the second plate 310 relative to the lower housing plate 318.

The engagement surface 360 may be formed at an angle to allow the eccentric cam 352 to continually rotate the locking cam 350 in the clockwise direction relative to the view shown in FIG. 18 until the engagement surface 360 securely engages the first projection 388 of the second plate 310. Allowing the locking cam 350 to rotate in the clockwise direction relative to the view shown in FIG. 18 until the engagement surface 360 securely contacts the first projection 388 ensures that the locking cam 350 is held in close engagement with the first projection 388 to prevent any rattling or movement between the locking cam 350 and the first projection 388 of the second plate 310. As such, the locking cam 350 concurrently serves as a locking cam to prevent rotation of the second plate 310 relative to the lower housing plate 318 and acts as a tolerance-absorbing cam to absorb any tolerances amongst the various components of the adjustment mechanism 300 to prevent any noise during operation of the adjustment mechanism 300 when the locking cam 350 is in engagement with the first projection 388 of the second plate 310.

A force may be applied to the eccentric cam 352 via a cable (not shown) attached to the cable seat 368. Placing the cable under tension causes a rotational force to be applied to the eccentric cam 352, thereby causing the eccentric cam 352 to rotate in the counter-clockwise direction relative to the view shown in FIG. 18. Because the eccentric cam 352 is fixed for rotation with the pivot pin 372, rotation of the eccentric cam 352 in the counter-clockwise direction relative to the view shown in FIG. 18 likewise causes rotation of the pivot pin 372 in the counter-clockwise direction relative to the view shown in FIG. 18 and against the bias imparted thereon by the biasing member 382.

When the eccentric cam 352 is initially rotated in the counter-clockwise direction relative to the view shown in FIG. 18, the locking cam 350 may be maintained in engagement with the first projection 388 of the second plate 310 (FIG. 19), as the post 370 of the eccentric cam 352 is permitted to move within the post aperture 358 of the locking cam 350. Allowing the eccentric cam 352 to move relative to the lower housing plate 318, without concurrently moving the locking cam 350 initially, reduces the efforts required to rotate the eccentric cam 352 and, thus, reduces the efforts required to move the locking mechanism 306 from the locked state (FIG. 18) to the unlocked state (FIG. 20).

Figure 19:
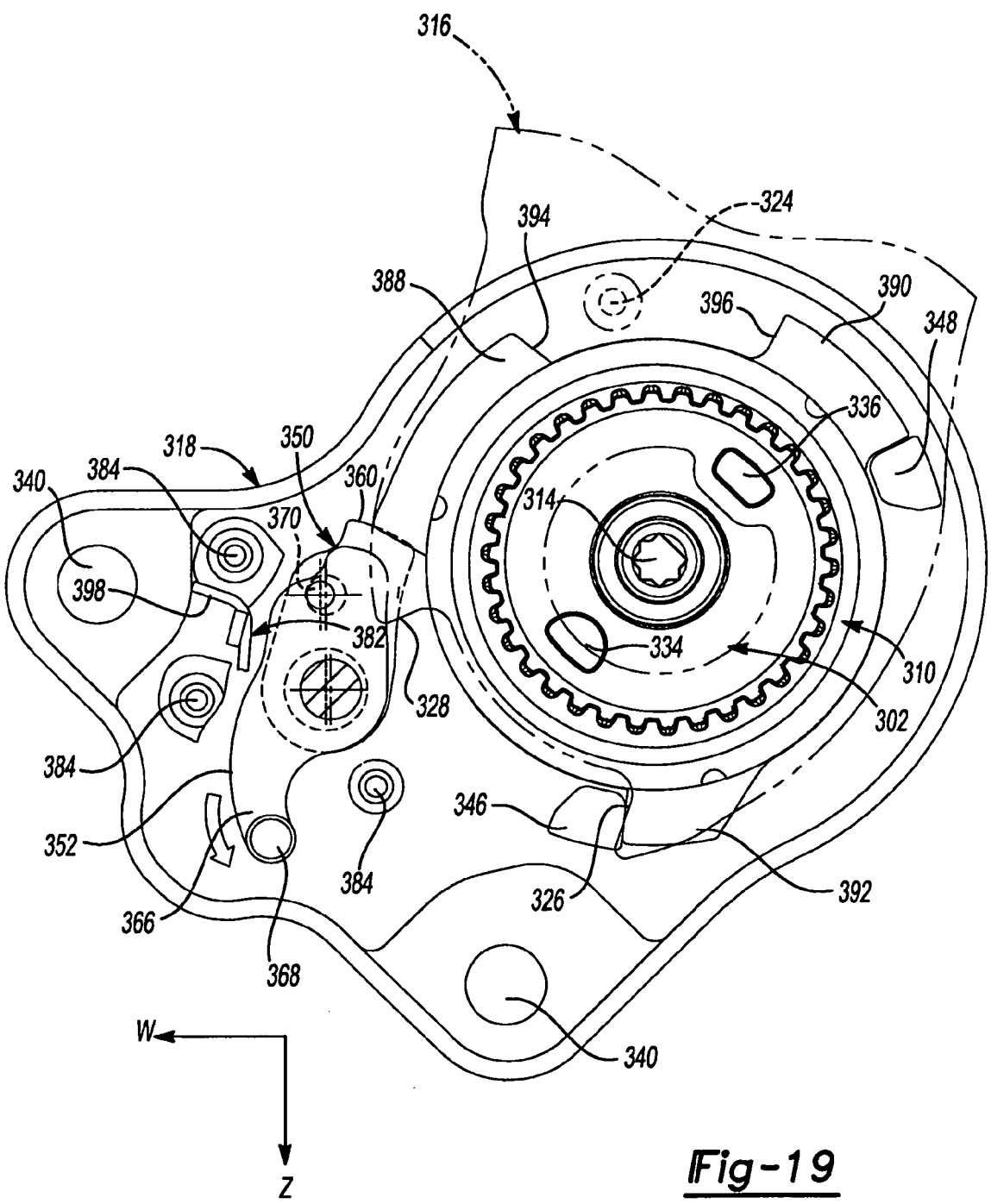
FIG. 19 is a side view of the adjustment mechanism of FIG. 14 with part of a housing removed to show internal components of the adjustment mechanism moving from a locked state to an unlocked state.
Figure 20:
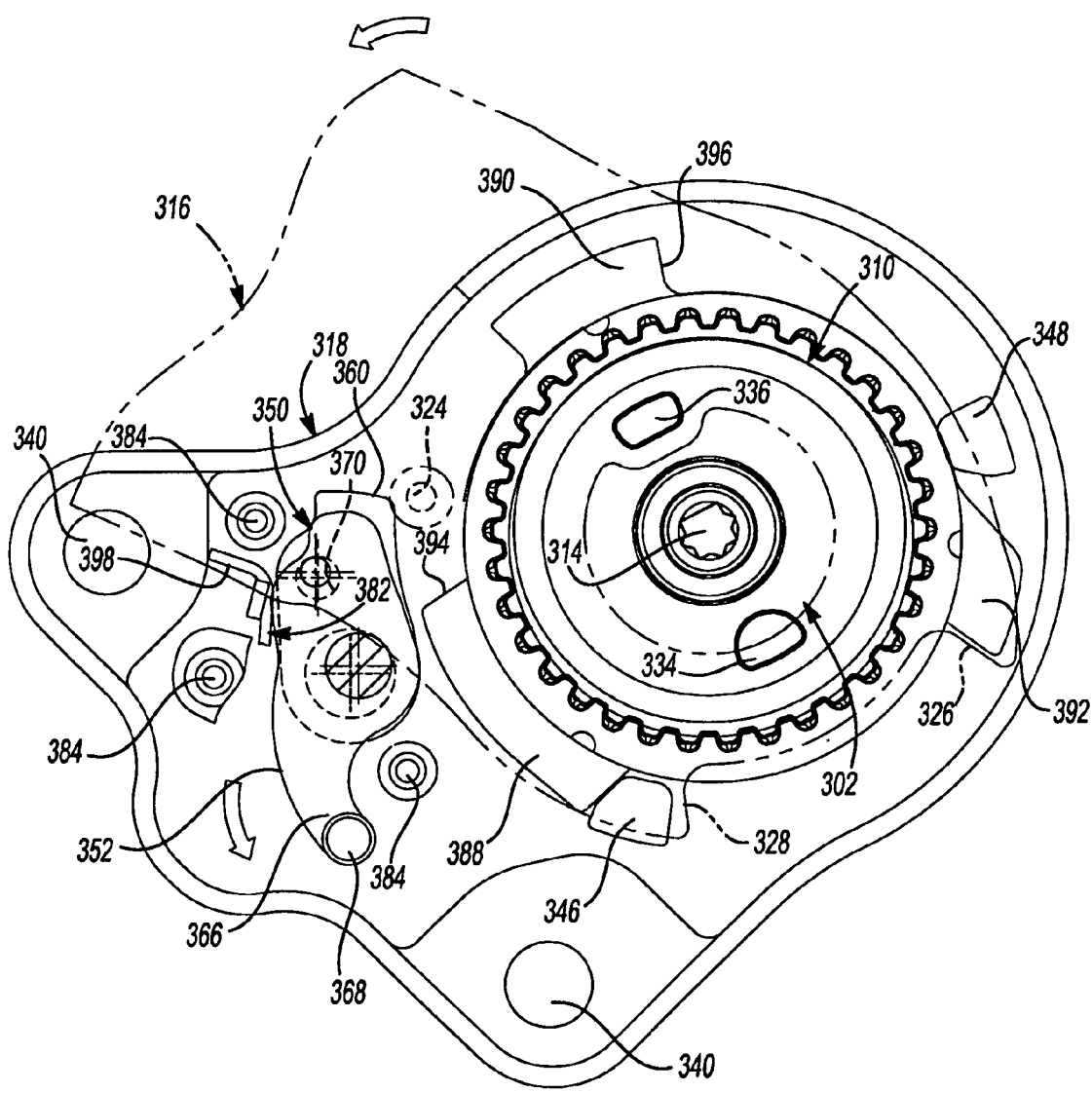
FIG. 20 is a side view of the adjustment mechanism of FIG. 14 with part of a housing removed to show internal components of the adjustment mechanism in an unlocked state and in an easy-entry position.

Continued rotation of the eccentric cam 352 in the counter-clockwise direction relative to the view shown in FIG. 19 causes the post 370 to engage the locking cam 350 within the post aperture 358 and causes the locking cam 350 to likewise rotate in the counter-clockwise direction relative to the view shown in FIG. 19. As described above, the locking cam 350 is rotatably supported by the projection 364 of the eccentric cam 352. Because the projection 364 of the eccentric cam 352 is eccentric to the axis of rotation (X) of the eccentric cam 352, when the locking cam 350 is rotated relative to the lower housing plate 318, the locking cam 350 moves concurrently in the (W) and (Z) directions shown in FIG. 19. Moving the locking cam 350 concurrently in the (W) and (Z) directions reduces the efforts required to disengage the locking cam 350 from engagement with the first projection 388 of the second plate 310, as the engagement surface 360 of the locking cam 350 is moved in two directions simultaneously away from the first projection 388 and, thus, reduces the friction required to disengage the engagement surface 160 from the first projection 388 of the second plate 310.

Once the locking cam 350 is removed from engagement with the first projection 388, a force may be applied to the upper housing plate 316 via the seatback 502 to rotate the upper housing plate 316 and seatback 502 relative to the lower housing plate 318. Because relative rotation between the first plate 308 and the second plate is prevented when the upper housing plate 316 and seatback 502 are rotated relative to the lower housing plate 318 and seat bottom 504, the angular position of the first plate 308 and the second plate 310 is fixed prior to, during, and following movement of the upper housing plate 316 and seatback 502 into the easy-entry position (FIGS. 20 and 22). Specifically, the position of the post 324 between the first projection 388 and the second projection 390 is maintained, as the relative position of the first plate 308 and the second plate 310 is maintained while the seatback 502 is moved from the upright position (FIG. 21) to the easy-entry position (FIG. 22).

Once a force is applied to the seatback 502 to return the seatback 502 from the easy-entry position (FIG. 22) to the upright position (FIG. 21), the biasing member 382 once again biases the locking cam 350 into engagement with the first projection 388 to maintain the seatback 502 in the upright position. Further, as the seatback 502 is rotated into the upright position (FIG. 21), the second projection 390 and third projection 392 may respectively engage the stops 348, 346 of the lower housing plate 318 to limit the rearward rotation of the seatback 502 relative to the lower housing plate 318.

Once the seatback 502 is sufficiently rotated relative to the seat bottom 504 and the locking cam 350 engages the first projection 388, rotation of the second plate 310 relative to the lower housing plate 318 is once again prevented until the locking cam 350 is removed from engagement with the first projection 388 of the second plate 310. As described above, once the seatback 502 is returned to the upright position (FIG. 21), the position of the seatback 502 relative to the seat bottom 504 is returned to the angular position that existed prior to movement of the seatback 502 into the easy-entry position, as the relative position of the first plate 308 and upper housing plate 312 relative to the second plate 310 and lower housing plate 318 remains fixed prior to, throughout, and following movement of the seatback 502 into the easy-entry position.

In each of the foregoing adjustment mechanisms 10, 100, 300, power to the recliner mechanisms 12, 102, 302 may be restricted upon movement of the seatback 502 into the easy-entry position to prevent damage to internal components of the recliner mechanisms 12, 102, 302. Restricting power to the various recliner mechanisms 12, 102, 302 may be accomplished via a controller (not shown), for example.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An adjustment mechanism comprising:
an upper housing plate;
a lower housing plate;
a recliner mechanism operable between an unlocked state permitting relative rotation between said upper housing plate and said lower housing plate and a locked state preventing relative rotation between said upper housing plate and said lower housing plate; and
a locking mechanism movable between a first state permitting relative rotation between said upper housing plate and said lower housing plate when said recliner mechanism is in said locked state and preventing relative rotation between said upper housing plate and said lower housing plate in a second state, said locking mechanism including a first cam and a second cam that are rotatable relative to said lower housing plate independently of rotation of said upper housing plate relative to said lower housing plate, said first cam contacting a different surface of said recliner mechanism than does said second cam.

2. The adjustment mechanism of claim 1, wherein said recliner mechanism rotates with one of said upper housing plate and said lower housing plate relative to the other of said upper housing plate and said lower housing plate when said locking mechanism is in said first state.

3. The adjustment mechanism of claim 2, wherein said first cam and said second cam are rotationally biased into engagement with said recliner mechanism.

4. The adjustment mechanism of claim 2, wherein one of said first cam and said second cam is moved out of engagement with said recliner mechanism in said first state by the other of said first cam and said second cam.

5. The adjustment mechanism of claim 2, wherein at least one of said first cam and said second cam includes an axis of rotation and a projection being offset relative to said axis of rotation.

6. The adjustment mechanism of claim 5, wherein the other of said first cam and said second cam is rotatably supported by said projection and is moved in two directions in response to rotation of said one of said first cam and said second cam.

7. The adjustment mechanism of claim 1, further comprising at least one projection fixed for movement with said recliner mechanism and operable to engage one of said upper housing plate and said lower housing plate to define a range of motion between said upper housing plate and said lower housing plate when said recliner mechanism is in said locked state and said locking mechanism is in said second state.

8. An adjustment mechanism comprising:
an upper housing plate;
a lower housing plate;
a recliner mechanism operable between an unlocked state permitting relative rotation between said user housing plate and said lower housing plate and a locked state preventing relative rotation between said upper housing plate and said lower housing plate; and
a locking mechanism movable between a first state permitting relative rotation between said upper housing plate and said lower housing plate when said recline mechanism is in said locked state and preventing relative rotation between said upper housing plate and said lower housing plate in a second state, said locking mechanism including a first cam and a second cam, said first cam contacting a different surface of said recliner mechanism than does said second cam,
wherein said recliner mechanism rotates with one of said upper housing plate and said lower housing plate relative to the other of said upper housing plate and said lower housing plate when said locking mechanism is in said first state,
wherein said first cam is biased into engagement with said recliner mechanism by a first biasing member and said second cam is biased into engagement with said recliner mechanism by a second biasing member, said second biasing member being different than said first biasing member.

9. An adjustment mechanism comprising:
an upper housing plate;
a lower housing plate;
a recliner mechanism operable between an unlocked state permitting relative rotation between said housing plate and said lower housing plate and a locked state preventing relative rotation between said user housing plate and said lower housing plate; and
a locking mechanism movable between a first state permitting relative rotation between said upper housing plate and said lower housing plate when said recliner mechanism is in said locked state and preventing relative rotation between said upper housing plate and said lower housing plate in a second state, said locking mechanism including a first cam and a second cam, said first cam contacting a different surface of said recliner mechanism than does said second cam,
wherein said recliner mechanism rotates with one of said upper housing plate and said lower housing plate relative to the other of said upper housing plate and said lower housing plate when said locking mechanism is in said first state,
wherein at least one of said first cam and said second cam moves in two directions when moved out of engagement with said recliner mechanism and into said second state.

10. An adjustment mechanism comprising:
an upper housing plate;
a lower housing plate;
a recliner mechanism including a first plate, a second plate, and a locking mechanism, said locking mechanism operable to prevent relative rotation between said first plate and said second plate and between said upper housing plate and said lower housing plate in a locked state and operable to permit relative rotation between said first plate and said second plate and between said upper housing plate and said lower housing plate in an unlocked state, one of said first plate and said second plate including an engagement surface operable to contact one of said upper housing plate and said lower housing plate when said recliner mechanism is in said locked state to define a first range of motion between said upper housing plate and said lower housing plate, said engagement surface is formed on a first projection extending from said one of said first plate and said second plate; and a second projection extending from said one of said first plate and said second plate, said second projection cooperating with said first projection to define a second range of motion between said upper housing plate and said lower housing plate when said locking mechanism is in said unlocked state, wherein one of said upper housing plate and said lower housing plate includes a tab movable between said first projection and said second projection to define said second range of motion.

11. An adjustment mechanism comprising:

an upper housing plate;

a lower housing plate;

a recliner mechanism including a first plate, a second plate, and a locking mechanism, said locking mechanism operable to prevent relative rotation between said first plate and said second plate and between said upper housing plate and said lower housing plate in a locked state and operable to permit relative rotation between said first plate and said second plate and between said upper housing plate and said lower housing plate in an unlocked state, one of said first plate and said second plate including an engagement surface operable to contact one of said upper housing plate and said lower housing plate when said recliner mechanism is in said locked state to define a first range of motion between said upper housing plate and said lower housing plate; and a first locking element operable to engage said one of said first plate and said second plate to selectively prevent relative rotation between said upper housing plate and said lower housing plate when said locking mechanism is in said unlocked state and said locked state.

12. The adjustment mechanism of claim 11, further comprising a second locking element operable to engage said one of said first plate and said second plate to selectively prevent relative rotation between said upper housing plate and said lower housing plate when said locking mechanism is in said unlocked state and said locked state.

13. The adjustment mechanism of claim 12, wherein said first locking element and said second locking element are rotatably supported by one of said upper housing plate and said lower housing plate.

14. The adjustment mechanism of claim 12, wherein said first locking element and said second locking element are independently biased into engagement with said one of said first plate and said second plate.

15. The adjustment mechanism of claim 12, wherein said first locking element and said second locking element selectively move out of engagement with said one of said first plate and said second plate to permit relative rotation between said upper housing plate and said lower housing plate when said locking mechanism is in said locked state.

16. The adjustment mechanism of claim 12, wherein at least one of said first locking element and said second locking element moves in two directions when moved out of engagement with said one of said first plate and said second plate to permit relative rotation between said upper housing plate and said lower housing plate when said locking mechanism is in said locked state.

* * * * *

UNITED STATES PATENT AND TRADEMARK OFFICE
CERTIFICATE OF CORRECTION

PATENT NO. : 9,022,479 B2
APPLICATION NO. : 13/511999
DATED : May 5, 2015
INVENTOR(S) : Jacob P. Hellrung et al.

Page 1 of 1

It is certified that error appears in the above-identified patent and that said Letters Patent is hereby corrected as shown below:

In the Claims

Column 20,
Line 5 (Claim 8), "user" should be -- upper --.
Line 11 (Claim 8), "recline" should be -- recliner --.
Line 33 (Claim 9), after "said" insert -- upper --.
Line 35 (Claim 9), "user" should be -- upper --.

Signed and Sealed this
Fifteenth Day of September, 2015

Michelle K. Lee
*Director of the United States Patent and Trademark Office*